(12) United States Patent
Rouseau et al.

(10) Patent No.: US 10,949,809 B2
(45) Date of Patent: Mar. 16, 2021

(54) CUSTOMIZED AUTHENTICATION AND DISBURSEMENT SYSTEM

(71) Applicant: Walmart Apollo, LLC, Bentonville, AR (US)

(72) Inventors: William Rouseau, Bella Vista, AR (US); Akhilesh Tirmandas, Bentonville, AR (US); Marina Hodges, Springdale, AR (US); Kyle Frey, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 114 days.

(21) Appl. No.: 16/246,491

(22) Filed: Jan. 12, 2019

(65) Prior Publication Data
US 2019/0236552 A1 Aug. 1, 2019

Related U.S. Application Data

(60) Provisional application No. 62/622,832, filed on Jan. 27, 2018.

(51) Int. Cl.
*G06Q 10/00* (2012.01)
*G06F 15/02* (2006.01)
(Continued)

(52) U.S. Cl.
CPC ..... *G06Q 10/1091* (2013.01); *G06Q 30/0284* (2013.01); *G06Q 40/125* (2013.12); *G06N 20/00* (2019.01)

(58) Field of Classification Search
USPC .................................................. 705/5, 7, 32
See application file for complete search history.

(56) References Cited

U.S. PATENT DOCUMENTS 6,648,222 B2 11/2003 McDonald et al.
7,050,986 B1 5/2006 Vance et al.
(Continued)

FOREIGN PATENT DOCUMENTS

WO 2001077937 A1 10/2001

OTHER PUBLICATIONS

Unknown, "How does automatic reloading work?", OV-chipkaart, https://www.ov-chipkaart.nl/travel-with-automatic-reloading/how-does-automatic-reloading-work-1.htm, captured Sep. 25, 2017, 2 pages.

(Continued)

*Primary Examiner* — Ariel J Yu

(57) ABSTRACT

Examples provide a customized travel expense system for predicting travel expenses for a user planning to travel to a remote training location and disbursing an authorized portion of the predicted travel expenses to the user at a predetermined time for utilization during a training event. A mode of travel is selected based on mode selection criteria and training schedule data. The total predicted travel expenses and a daily expense allotment is calculated based on the selected mode and a rate associated with the selected mode. A user's presence at a training event provided at the remote training location is verified based on sensor data obtained from sensor devices located at the training location. An amount of funds equivalent to at least a portion of the total predicted travel expenses is uploaded to an account associated with the user in real-time for utilization by the user during the training event.

13 Claims, 15 Drawing Sheets

(51) Int. Cl.
*G07C 1/10* (2006.01)
*G06Q 10/10* (2012.01)
*G06Q 40/00* (2012.01)
*G06Q 30/02* (2012.01)
*G06N 20/00* (2019.01)

(56) References Cited

U.S. PATENT DOCUMENTS

| | | | |
|---|---|---|---|
| 9,208,490 B2 | 12/2015 | Pitroda et al. | |
| 9,552,604 B2 | 1/2017 | Bettridge et al. | |
| 2006/0136131 A1* | 6/2006 | Dugan | G08G 1/14 701/300 |
| 2008/0319808 A1 | 12/2008 | Wofford et al. | |
| 2011/0066468 A1 | 3/2011 | Huang et al. | |
| 2012/0136571 A1 | 5/2012 | Simon et al. | |
| 2014/0006067 A1* | 1/2014 | Rothley | G06Q 10/06 705/5 |
| 2014/0236782 A1 | 8/2014 | Shaw et al. | |
| 2015/0302453 A1 | 10/2015 | Tietzen et al. | |
| 2016/0140464 A1* | 5/2016 | Tomoeda | G06Q 10/0633 705/7.17 |
| 2016/0293025 A1 | 10/2016 | Marr et al. | |
| 2017/0270623 A1 | 9/2017 | Lyman et al. | |
| 2018/0285873 A1* | 10/2018 | Espinoza | G06Q 20/405 |

OTHER PUBLICATIONS

Unknown, "Autoload: Important things to know when activating Autoload", https://www.transperth.wa.gov.au/SmartRider/Using-SmartRider/Autoload, captured Sep. 27, 2017, 3 pages.

Copenheaver, Blaine R., "International Search Report", International Application No. PCT/US2019/013402, dated May 7, 2019, 4 pages.

Copenheaver, Blaine R., "Written Opinion of the International Searching Authority", International Application No. PCT/US2019/013402, dated May 7, 2019, 8 pages.

Concur Technologies, "Concur Expense Quickstart Guide", Version 1.0, Aug. 22, 2014, 23 pages, https://www.rpi.edu/dept/finance/docs/travel/Concur%20Expense%20Guide.pdf.

* cited by examiner

FIG. 2

CUSTOMIZED TRAVEL EXPENSE COMPONENT 200

SELECTION COMPONENT 202

- TRAINING SCHEDULE DATA 204
  - FUTURE TIME-PERIOD 210
  - TRAINING EVENT 206
  - SELECTED ROUTE 214
  - PLURALITY OF USERS 212
- SET OF TRAVEL CRITERIA 218
- MODE OF TRAVEL 220
- LOCATION DATA 215
  - FIRST LOCATION 211
  - REMOTE TRAINING LOCATION 208
- REAL-TIME CONTEXT DATA 216

PREDICTION COMPONENT 222

- PREDICTED TRAVEL DURATION 224
  - SET OF TRAINING DAYS 226
  - PREDICTED ROUND TRIP TRAVEL TIME 228

CALCULATION COMPONENT 230

- SET OF ALLOCATION RULES 239
- TOTAL PREDICTED TRAVEL EXPENSES 232
- DAILY EXPENSE ALLOTMENT 234
- SELECTED MODE 236
- RATE 238
- AUTHORIZATION REQUEST 240

FIG. 9

| SET OF MODE SELECTION CRITERIA 900 ||
|---|---|
| < 60 MILES | PERSONAL VEHICLE 902 |
| ≥ 60 MILES | RENTAL CAR 904 |
| ≥ 300 MILES | AIR TRAVEL 906 |

| | A | B | C | D | E | F | G | H |
|---|---|---|---|---|---|---|---|---|
| 1 | LINE NUMBER | TRANSACTION # | RELOAD AMOUNT 1 | CUSTOMER ID | ACCOUNT NO IDENTIFIER | ACCOUNT NO | | |
| 2 | 1 | 1116-XXXX | 250.75 | 212592737 | PRN | 01567XXXX | | |
| 3 | 2 | | | | | | | |
| 4 | 3 | | | | | | | |
| 5 | | | | | | | | |
| 6 | | | | | | | | |
| 7 | LINE NUMBER | TRANSACTION # | FIRST NAME | LAST NAME | ACTIVATION AMOUNT 1 | CUSTOMER ID | ACCOUNT NO IDENTIFIER | ACCOUNT NO |
| 8 | 1 | 5275-XXXX | JANE | DOE | 398.98 | WIN # | PRN | PRN# |
| 9 | 2 | | | | | | | |
| 10 | 3 | | | | | | | |
| 11 | | | | | | | | |

1404 (rows 1-6)
1402 (rows 7-11)

Verification of Funds Received

I confirm that I will incur the following expenses through the duration of the Train the Trainer Session:

Meals: _____
Check-in Baggage: _____
Acknowledgement of:
I acknowledge that I have read and understand terms and conditions of this prepaid expense card XXXX and that I am responsible for ensuring these funds cover the intended expenses. I understand that if I spend the allotted funds before the end of the audit session, no additional funds that will be provided. Also, if I do not complete the training session I am not eligible for the total funds provided. The pro-rated funds for the time I attended would be the only funds eligible to retain.

By signing below, I acknowledge and I agree that I received a prepaid expense card for the expenses described above.

Associate Signature:_____
Print Name: John Doe
Store Number: _____
Date: _____

Signature
_____
Date
_____

CUSTOMIZED AUTHENTICATION AND DISBURSEMENT SYSTEM

BACKGROUND

It is sometimes beneficial to send users, such as employees or other personnel, to a remote location for training, educational purposes, and/or to perform work-related tasks at an off-site location. Travel for these purposes generates expenses for the users. Typically, users save receipts for expenses incurred during travel. The users provide the receipts with a request for reimbursement sometime after the travel expenses have already been paid by the user. In some cases, reimbursement of expenses paid by the user for travel can be delayed for several days or several weeks after the reimbursement request is submitted. This is inefficient and sometimes burdensome for users that may be uncertain as to when they will receive reimbursements.

SUMMARY

Some examples of the disclosure provide a system for customizing travel expense allocations and disbursements. The system includes a memory, at least one processor communicatively coupled to the memory, an account corresponding to a travel card associated with a user, and a set of sensor devices associated with a remote location. A selection component selects a mode of travel based on a set of mode selection criteria and training schedule data associated with a training event the user is scheduled to attend at the remote training location during a future time-period, including a selected route between the first location and the remote training location. A calculation component calculates a total predicted travel expense to be incurred by the user during a travel duration based on the selected mode and a rate associated with the selected mode. The travel duration includes a set of training days associated with the training event and predicted travel time associated with round-trip travel time corresponding to the selected route. A verification component verifies a presence of the user at the remote location for at least the portion of the training event based on an analysis of sensor data obtained from the set of sensor devices. An authorization component authorizes allocation of at least a portion of the total predicted travel expenses to the user on condition of attendance verification and unauthorizes allocation of at least the portion of the total predicted travel expenses on condition of a failure to verify attendance. An allocation component disburses an amount of funds equivalent to at least a portion of the total predicted travel expenses to a user account.

Other examples provide a computer-implemented method for customizing travel expense allocations. A selection component selects a mode of travel for a first user scheduled to attend a training event provided at a remote location based on a set of mode selection criteria and a selected route between a home location associated with the first user and the remote location. A calculation component calculates total predicted travel expenses anticipated to be incurred by the first user during a predicted travel duration based on a rate associated with the selected mode. The predicted travel duration includes a set of training days associated with the training event and round-trip travel time associated with the selected route. An authorization component authorizes allocation of the calculated total predicted travel expenses to the first user if a threshold value exceeds the total predicted travel expenses. If the total predicted travel expenses exceed the threshold value, authorization of at least a portion of the calculated total predicted travel expenses for allocation to the first user is obtained from an authorization component executing on a remote computing device associated with a second user. A disbursement component uploads or transfers funds equivalent to at least a portion of the total predicted travel expenses to an account associated with the first user for utilization by the first user during the training event.

Other examples provide a system for customizing daily travel expense allocations. The system includes a memory, at least one processor communicatively coupled to the memory, and a set of sensor devices associated with a user device assigned to a user. A selection component analyzes training schedule data associated with a training event the user is scheduled to attend at a remote training location during a future time-period and real-time context data associated with a selected route between the first location and the remote training location using a set of mode selection criteria to select a mode of travel. A prediction component generates a predicted travel duration associated with the training event. The predicted duration includes a set of training days associated with the training event and travel time associated with predicted round-trip travel time between the first location and the remote training location. A calculation component calculates an anticipated total predicted travel expenses to be incurred by the user during the predicted travel duration and a daily expense allotment for each day in the set of training days based on the selected mode and a rate associated with the selected mode. An analysis component analyzes sensor data obtained from the set of sensor devices to verify a presence of the user at the remote training location on a given day in the set of training days. A verification component authorizes allocation of the daily expense allotment to the user on the selected day on condition of verifying the presence of the user at the remote training location based on the analysis and denies or otherwise withholds allocation of the daily expense allotment on failure to verify the presence of the user on the selected day. An allocation component analyzes the total predicted travel expenses and the daily expense allotment using a set of allocation rules to disburse an amount of funds sufficient to cover predicted expenses associated with the selected day to a user account in real-time on the selected day.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2 is an exemplary block diagram illustrating a customized travel expense allocation component for calculating predicted travel expenses.

FIG. 9 is an exemplary block diagram illustrating a set of mode selection criteria.

FIG. 14 is an exemplary diagram illustrating a batch file.

FIG. 15 is an exemplary screenshot of a verification of funds request.

Corresponding reference characters indicate corresponding parts throughout the drawings.

DETAILED DESCRIPTION

Referring to the figures, examples of the disclosure enable customized allocation of predicted travel expenses in real-time. In some examples, a customized travel expense component determines a user's predicted duration of travel to a remote training location, predicts total anticipated expenses to be incurred during the duration of travel, and allocates at least a portion of the predicted expenses to the user for utilization during the predicted duration of travel and attendance of a training event at the remote training location. This enables more accurate disbursement of training expenses to users while reducing/eliminating delays associated with reimbursing expenses incurred after-the-fact. The automatic calculation of per-user predicted expenses and uploading of funds to cover the predicted expenses in real-time further enables improved resource allocation and more accurate assessment of training-related expenses prior to occurrence of a remote (off-site) training event.

Figure 1:
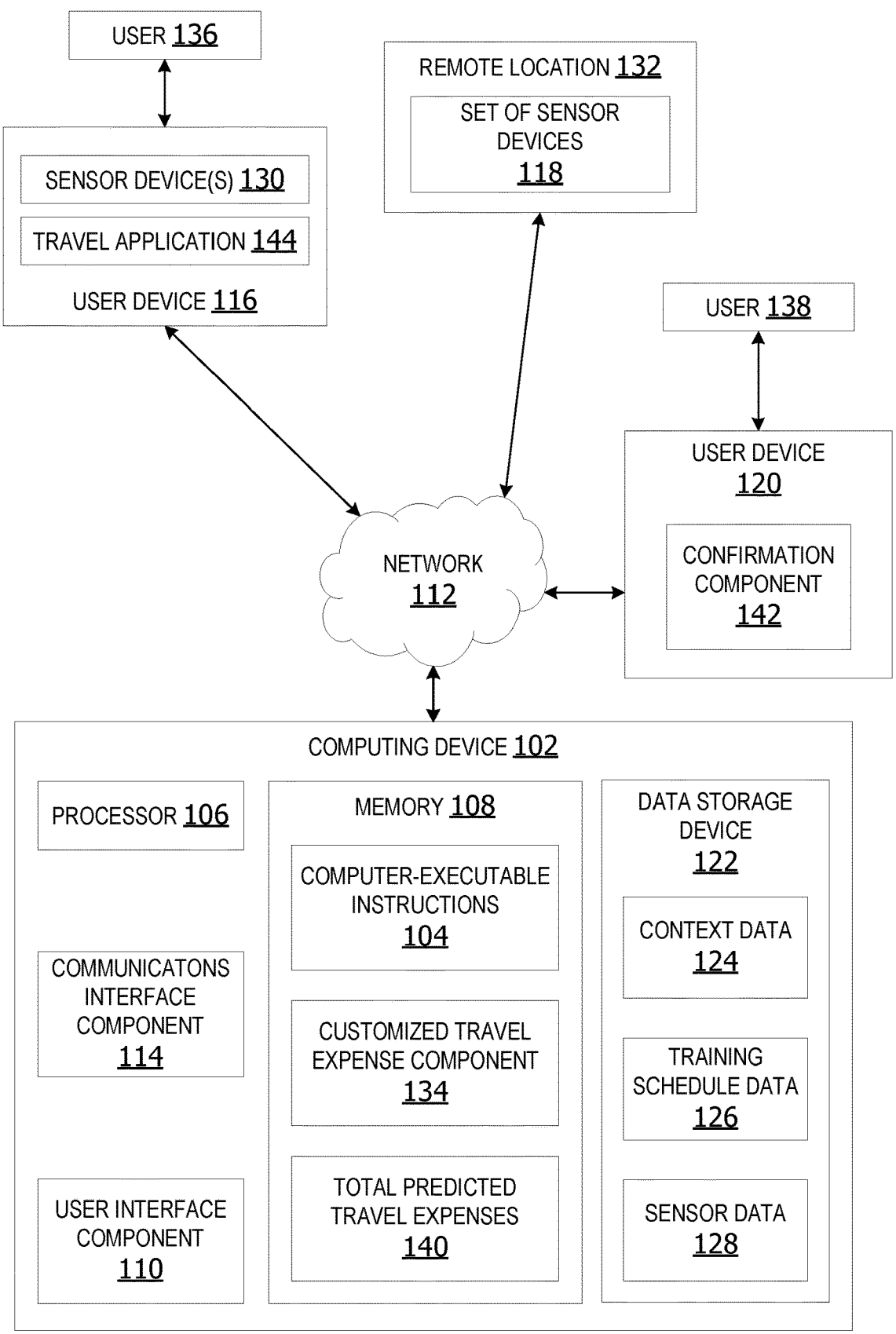
FIG. 1 is an exemplary block diagram illustrating a system for customizing travel expense allocations.

Referring again to FIG. 1, an exemplary block diagram illustrates a system 100 for customizing travel expense allocations and disbursements for each user scheduled to attend a training event at a remote location necessitating travel. In the example of FIG. 1, the computing device 102 represents any device executing computer-executable instructions 104 (e.g., as application programs, operating system functionality, or both) to implement the operations and functionality associated with the computing device 102. The computing device 102 can include a mobile computing device or any other portable device. In some examples, the mobile computing device includes a mobile telephone, laptop, tablet, computing pad, netbook, gaming device, wearables, and/or portable media player. The computing device 102 can also include less-portable devices such as servers, desktop personal computers, kiosks, or tabletop devices. Additionally, the computing device 102 can represent a group of processing units or other computing devices.

In some examples, the computing device 102 has at least one processor 106 and a memory 108. The computing device 102 can also include a user interface component 110.

The processor 106 includes any quantity of processing units and is programmed to execute the computer-executable instructions 104. The computer-executable instructions 104 can be performed by the processor 106 or by multiple processors within the computing device 102 or performed by a processor external to the computing device 102. In some examples, the processor 106 is programmed to execute instructions such as those illustrated in the figures (e.g., FIG. 1, FIG. 2, FIG. 3, FIG. 4, FIG. 5, FIG. 6, FIG. 7, FIG. 8, and FIG. 9).

The computing device 102 further has one or more computer readable media such as the memory 108. The memory 108 includes any quantity of media associated with or accessible by the computing device 102. The memory 108 in FIG. 1 is internal to the computing device 102. In other non-limiting examples, the memory 108 is external to the computing device (not shown) or both internal and external to the computing device (not shown). The memory 108 in still other examples includes read-only memory and/or memory wired into an analog computing device.

The memory 108 stores data, such as one or more applications. The applications, when executed by the processor 106, operate to perform functionality on the computing device 102. The applications can communicate with counterpart applications or services such as web services accessible via a network 112. In an example, the applications represent downloaded client-side applications that correspond to server-side services executing in a cloud.

In other examples, the user interface component 110 includes a graphics card for displaying data to the user and receiving data from the user. The user interface component 110 can also include computer-executable instructions (e.g., a driver) for operating the graphics card. Further, the user interface component 110 can include a display (e.g., a touch screen display or natural user interface) and/or computer-executable instructions (e.g., a driver) for operating the display.

The user interface component 110 can also include one or more of the following to provide data to the user or receive data from the user: speakers, a sound card, a camera, a microphone, a vibration motor, one or more accelerometers, a BLUETOOTH brand communication module, global positioning system (GPS) hardware, and a photoreceptive light sensor. In an example, the user can input commands or manipulate data by moving the computing device 102 in a particular way.

The network 112 is implemented by one or more physical network components, such as, but without limitation, routers, switches, network interface cards (NICs), and other network devices. The network 112 can be any type of network for enabling communications with remote computing devices, such as, but not limited to, a local area network (LAN), a subnet, a wide area network (WAN), a wireless (Wi-Fi) network, or any other type of network. In this example, the network 112 is a WAN, such as the Internet. However, in other examples, the network 112 is a local or private LAN.

In some examples, the system 100 optionally includes a communications interface component 114. The communications interface component 114 includes a network interface card and/or computer-executable instructions (e.g., a driver) for operating the network interface card. Communication between the computing device 102 and other devices, such as but not limited to the user device 116, the set of sensor devices 118, and/or the user device 120, can occur using any protocol or mechanism over any wired or wireless connection. In some examples, the communications interface component 114 is operable with short range communication technologies such as by using near-field communication (NFC) tags.

User device 116 and user device 120 represent any device executing computer-executable instructions. The user device 116 and the user device 120 can be implemented as a mobile computing device, such as, but not limited to, a wearable computing device, a mobile telephone, laptop, tablet, computing pad, netbook, gaming device, and/or any other portable device. The user device 116 and the user device 120 include at least one processor and a memory. The user device 116 and the user device 120 can also include a user interface component.

The system 100 optionally includes a data storage device 122 for storing data, such as, but not limited to context data 124, training schedule data 126, and/or sensor data 128. The sensor data 128 is data generated by one or more sensor devices. The sensor data 128 can include image capture data, audio data, biometric data, etc. The sensor data 128 can be generated by one or more sensor devices associate with a user device, such as but not limited to, the sensor device(s) 130. The sensor data 128 can also be generated by one or more sensor devices associated with a remote training location, such as, but not limited to, the set of sensor devices 118 associated with a remote location 132.

The data storage device 122 can include one or more different types of data storage devices, such as, for example, one or more rotating disks drives, one or more solid state drives (SSDs), and/or any other type of data storage device. The data storage device 122 in some non-limiting examples includes a redundant array of independent disks (RAID) array. In other examples, the data storage device 122 includes a database. In still other examples, data is be stored on a cloud storage.

The data storage device 122 in this example is included within the computing device 102 or associated with the computing device 102. In other examples, the data storage device 122 is a remote data storage accessed by the computing device via the network 112, such as a remote data storage device, a data storage in a remote data center, or a cloud storage.

The memory 108 in some examples stores one or more computer-executable components. Exemplary components include a customized travel expense component 134. The customized travel expense component 134, when executed by the processor 106 of the computing device 102, selects a mode of travel for a first user 136 scheduled to attend a training event provided at the remote location 132 from a home location of the first user 136. In some examples, the customized travel expense component 134 calculates a total predicted travel expenses 140 based on an analysis of context data 124 and the training schedule data 126.

The mode of travel in some examples is entered/provided or selected by a user. In other examples, the system autonomously selects the most expedient, practical or efficient mode of travel based on the point of departure, destination, available modes of travel, schedules for various modes of travel, cost of the various modes of travel and/or user-provided preferences. For example, the system may select air travel based on the distance, destination, air fare, flight schedules and/or user preferences for air travel. Likewise, the system is capable of autonomously selecting a particular carrier/travel provided based on these factors as well.

The context data 124 is data describing current conditions or predicted future conditions associated with the planned route of travel from the user's original location (home location or regular work location) to the remote location 132. The context data 124 include, for example but without limitation, weather feeds, news feeds, traffic feeds, event data, current weather conditions, predicted weather conditions, etc.

In an example, the context data 124 includes weather data indicating severe rain or thunderstorms are predicted along the planned route. In another non-limiting example, the context data 124 indicates icy conditions and/or snow at the user's current location. In still another example, the context data includes data identifying traffic patterns, road closures, detours, and other factors that impact travel time along a route.

The training schedule data 126 is data including the location/address of the remote location 132 where a training event is scheduled to occur. The training schedule data 126 can include coordinates (latitude and longitude) of the remote location. The training schedule data 126 can also include a set of training days identifying a date and/or time for each training event the user 136 is scheduled to attend at the remote location 132.

In some examples, if the total predicted travel expenses exceed a threshold amount, the customized travel expense component 134 is configured to withhold disbursement of the total predicted travel expenses without additional authorization. In these examples, the customized travel expense component 134 requests authorization from a remote confirmation component 142 executing on the user device 120 associated with a user 138. In this example, the user 138 is a training manager having authority to authorize allocation of travel expenses. If the predicted travel expenses are authorized by the user 138, the remote confirmation component 142 sends the authorization to the customized travel expense component 134 via the network 112. If authorization is not received, the customized travel expense component 134 denies allocation of at least a portion of the predicted expenses to the user 136.

In some examples, the customized travel expense component 134 transfers funds equivalent to at least a portion of the total predicted travel expenses from a designated expense account or other fund repository to an account associated with the user 136 for utilization by the first user during the training event. In other examples, the customized travel expense component 134 authorizes a third party to transfer the funds to the user's account.

In some examples, the customized travel expense component 134 sends a notification to a travel application 144 associated with the user device 116 to provide the user 136 with notice that at least a portion of the total predicted travel expenses are available in an account associated with the user for utilization by the user 136 during the training event.

The travel application 144 in other examples provides a user confirmation page for the user 136 to verify their home address, confirm planned attendance at the training event, provide location data, acknowledge receipt of disbursed funds to be used during the training event, and other data associated with the customized travel expense process.

The customized travel expense component 134 calculates distance (mileage/kilometers) from the first location (a user's residence or home store location) to the remote location. The first location can be the user's residence, business/workplace address, home store location or other starting point.

The customized travel expense component 134 in some examples sends a request for user confirmation of the first location address to the user device 116. If the user changes the first location, the customized travel expense component 134 updates the location data, mileage calculation, and/or predicted expense pre-paid amount. For example, the user might change the first location from the user's old home address to a new home address or a work address.

When funds are disbursed to a user, the travel application associated with the user device 116 outputs a verification of funds received/acknowledgement of funds to the user 136. The user in this example provides the verification via the travel application or via a print-out of the verification funds.

FIG. 2 is an exemplary block diagram illustrating a customized travel expense allocation component 200 for calculating predicted travel expenses. A selection component 202 analyzes training schedule data 204 associated with a training event 206 that a user is scheduled to attend at a remote training location 208 during a future time-period 210. The user is a person scheduled to travel from a first location 211 to the remote training location 208 to attend at least a portion of the training event 206, such as the user 136 in FIG. 1. The training event 206 includes any type of training classes, training evaluations, training seminars, training lectures, or any other training event.

The training schedule data 204 is data associated with a plurality of users 212 scheduled to attend a part of the training event or all of the training event 206. The training schedule data 204 can include a set of training days during which the training event is being held during the future time-period. The set of training days includes one or more days during which a training class or other training event is scheduled to occur. The training schedule data 204 can include a start date for the training event, an end date of the training event, dates each user in the plurality of users are scheduled to attend a training class or other training-related event, a selected route 214, as well as any other scheduling data.

The selected route 214 is a planned round-trip route from the first location 211 to the remote training location 208. The first location 211 is the point of departure, home address, or work address of the user. In other words, the first location is the starting location from which the user is scheduled to leave for travel to the remote training location 208.

The remote training location 208 is a location at which the training event 206 is scheduled to be presented, such as the remote location 132 in FIG. 1. The remote training location 208 can be identified using an address or coordinates (latitude or longitude) of the remote training location 208. The first location 211 and the remote training location 208 data can be provided in location data 215.

The selection component 202 in some examples analyzes the training schedule data 204 with real-time context data 216 associated with the selected route 214 between the first location 211 and the remote training location 208 using a set of mode selection criteria 218 to autonomously select a mode of travel 220. The real-time context data 216 includes data associated with current and predicted future conditions associated with the selected route 214. The context-data 216 in some non-limiting examples is provided via news feeds, weather feeds, user-provided data, sensor data, etc. The context-data 216 can include data describing current or predicted traffic conditions along a route, weather conditions, events, etc. Weather conditions include information such as, but not limited to, snow, icy roads, rain, local flooding, fog, etc. Events include, without limitation, parade routes, holiday closures, airport closures, flight delays, etc.

The selected mode of travel 220 is a means of travel from the first location 211 to the remote training location 208. The mode of travel 220 includes, without limitation, automobile travel, air travel (commercial airline), passenger train, bus travel, taxi cab, tram, subway travel, ferry boat travel, passenger boat travel, private plane travel, or any other mode of transportation, etc. The selected route 214 for a user includes one or more modes of travel. For example, two modes of travel can be selected where the first portion of a trip includes automobile travel to a first airport and then travel from the first airport to a second airport by commercial aircraft.

The set of mode selection criteria 218 provides rules/criteria for selecting a mode of travel. In an example, the set of mode selection criteria 218 includes a rule providing that if the travel distance is greater than fifty miles, air travel should be the selected mode of travel. In other examples, the set of mode selection criteria 218 includes a rule specifying that if a selected route 214 is less than fifty miles, the mode of travel 220 should be automobile or bus. In another non-limiting example, the rules specify that if a selected route 214 corresponds with a passenger train route, the mode of travel should be by passenger train.

A prediction component 222 generates a predicted travel duration 224 associated with the training event 206. The predicted travel duration 224 includes a set of one or more training days 226 associated with the training event 206. Each day in the set of training days 226 is a day during which at least one training class or other training activity is scheduled to take place. For example, if training classes are scheduled to occur Friday afternoon, Saturday morning, and Sunday morning, the set of training days 226 includes three days.

In other examples, the set of training days 226 includes a set of days from a first day of training to a last day of training, including all days in-between the first day and the last day. For example, if the first day of training is a Monday and the last day of training is a Friday, the set of training days includes five days.

The predicted travel duration 224 also includes predicted round-trip travel time 228 between the first location 211 and the remote training location 208. The predicted round-trip travel time 228 is a predicted amount of time to travel between the first location 211 and the remote training location 208 given current weather conditions, predicted weather conditions during the planned travel, expected traffic conditions during the planned travel, etc. A training day and a travel day can overlap. For example, if a training event does not occur until Saturday afternoon and the user is able to travel to the remote training location 208 in the morning of the same day, then the predicted travel duration only includes a single day for both the travel and the training event on Saturday.

A calculation component 230 calculates an anticipated total predicted travel expenses 232 to be incurred by the user during the predicted travel duration 224. The calculation component 230 calculates a daily expense allotment 234 for each day in the set of training days 226 based on the selected mode 236 and a rate 238 associated with the selected mode 236.

The calculation component 230 analyzes the total predicted travel expenses 232 using a set of allocation rules 239 to identify the daily expense allotment. The set of allocation rules 239 specify daily food allotments, mileage rates, threshold per day expense maximum values, total maximum expense allocation threshold values, etc. The daily expense allotment 234 includes an allotment predicted to cover expenses for a single day, including travel, meals, and lodging.

In some examples, the calculation component 230 sends an authorization request 240 to an authorization component associated with the customized travel expense component 200, such as the authorization component in FIG. 3 below. The authorization request 240 in some examples requests authorization to disburse the total predicted travel expenses 232 to the user. In other examples, the authorization request 240 requests authorization to disburse the daily expense allotment for a selected day to an account associated with the user on the selected day or within a predetermined time-period before the selected day. In a non-limiting example, the daily expense allotment is disbursed on the morning of the selected day, in the evening of the selected day, or the day before the previous selected day.

The calculation component calculates expenses for travel based on a selected travel mode. The expenses are calculated, for example, on a daily basis, a weekly basis, or for multiple week trainings. In one example, the calculation component calculates expenses for a stay in a hotel for a weekend equal to training week expense calculation plus weekend travel allotment, meals for each training day in the set of training days, and meals for travel days.

In one example, if a user travels home between training classes, the calculation component treats the expense calculation like two separate trainings. In other words, two separate predicted travel expense allocations are calculated for each of the trainings separated by a trip back home.

In an example, if a user requests allocation of additional funds for additional expenses, the user submits a request for reimbursement to the customized travel expense component. The user attaches a receipt with the request for reimbursement of the additional expenses. The customized travel expense component obtains approval from the confirmation component. If the additional expenses are approved, the customized travel expense component loads the approved and verified funds for the additional reimbursable expenses into the user's account associated with the travel card. This enables the user to receive immediate allocation of funds for expense during the training event.

Figure 3:
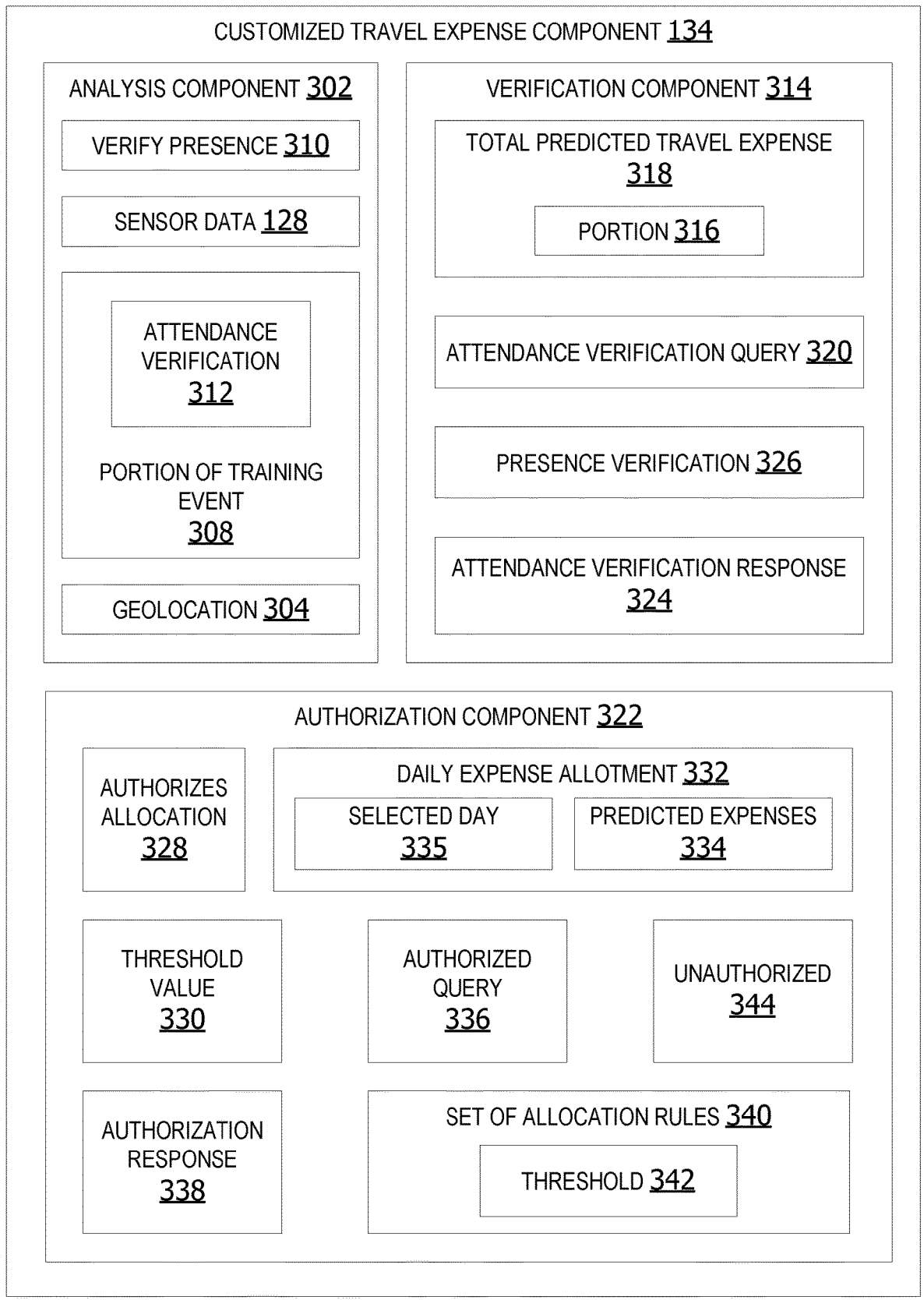
FIG. 3 is an exemplary block diagram illustrating a customized travel expense allocation component for automatically disbursing a pre-approved daily expense allotment of funds to a user.

FIG. 3 is an exemplary block diagram illustrating a customized travel expense allocation component 134 for automatically disbursing a pre-approved daily expense allotment of funds to a user. An analysis component 302 analyzes geolocation data 304 generated by a sensor device associated with a remote training location to verify the presence of the user at the remote location on a selected day prior to disbursing a daily expense allotment for that selected day to the user. In some examples, the geolocation data is generated by a global positioning system (GPS) or other location sensor device associated with a user device, such as the user device 116 in FIG. 1.

The geolocation data 304 in other examples is used in associated with a geofence associated with the remote location. The geolocation data 304 is optionally analyzed to determine whether the user is within a geofence associated with the training location. A geofence includes a set of boundaries defining a training area. If the user is within the geofence boundaries during the training event on a selected day, the user is authorized to receive funds to cover predicted expenses for that selected day. If the geolocation data 304 does not confirm the user's presence within the geofence boundaries, the customized travel expense component requests confirmation of the user's attendance at the training event on the selected day from a confirmation component associated with a computing device location at the remote location.

In other examples, the geolocation data 304 is utilized by the customized travel expense component to verify a user's location. The user's location is utilized by the customized travel expense component for calculation of travel distance to the training location and/or selection of a mode of travel.

In other examples, the analysis component 302 analyzes sensor data 128 generated by a set of sensor devices located at the remote training location and/or any other network device for verifying presence of the user at a location associated with the training, such as image capture data generated by image capture device(s), biometric sensor data generated by biometric sensor(s), audio data generated by microphone(s), and/or any other type of sensor data for verifying a presence of a user at the remote training location for a portion of the training event 308.

In one example, the analysis component 302 analyzes sensor data generated by a set of sensor devices located at a hotel or other place of accommodation to confirm/verify presence of the user for receipt of funds for utilization during training. In other examples, the set of sensor devices includes a networked device located in a conference room or other training event space.

In another example, the sensor data includes, without limitation, a debit card reader, a credit card reader, a networked user device, or any other network-connected device capable of verifying location of the user. The network-connected device transmits sensor data/verification data to unlock or release funds allocated for utilization by the user during the training event if the user is verified as present for the training event.

The analysis component 302 in some examples, analyze the sensor data 128 generated by a set of sensor devices associated with a first user device assigned to the user to verify presence 310 of the user at the remote location for at least a portion of a given day in the set of training days. A daily pro-rata portion 316 of the total predicted travel expenses 318 is disbursed to the user on each day in the set of training days in which the presence of the user at the remote location for at least a portion of the training event is verified. The daily pro-rata portion of the total predicted travel expenses is not disbursed to the user if the presence of the user at the remote location on a given training day is unverified.

In another example, the verification component verifies a user's presence at a training location via a user log-in by a training application on a user device associated with the user. In this manner, the user's presence is validated via a sign-in to an application via a Wi-Fi or network device associated with the remote training location.

A verification component 314 verifies a presence of the user at the remote location for at least the portion of the training event 308 based on an analysis of the sensor data 128. If the analysis component is able to verify presence 310 of the user, the analysis component generates an attendance verification 312. If an authorization component 322 receives the attendance verification 312 from the verification component, the authorization component 322 determines whether to authorize allocation of the portion of the total predicted travel expense 318 to the user In some examples, if the attendance verification 312 is not received from the verification component 314, the verification component 314 sends an attendance verification query 320 to an authorization component on a remote user device associated with a training manager, such as the confirmation component 142 on the user device 120 in FIG. 1. If the verification component 314 receives an attendance verification response 324 including a presence verification 326, the authorization component 322 determines whether to authorize allocation of funds to the user for one or more of the training days. If verification of the user's presence/attendance at the remote location is unverified based on sensor data and the attendance verification query results, the authorization component does not authorize allocation of funds to the user's account.

The authorization component 322 authorizes allocation 328 of the total predicted travel expense 318 on condition a threshold value 330 exceeds the total predicted travel expenses 318. In other examples, the authorization component 322 authorizes allocation 328 of a daily expense allotment 332 on condition the daily expense allotment does not exceed a daily expense allotment threshold value, such as the threshold value 330. For example, if the daily expense allotment is one-hundred thirty dollars and the daily expense allotment threshold value is one-hundred thirty-five dollars, the authorization component 322 automatically authorizes allocation of the daily expense allotment 332.

The daily expense allotment 332 in some examples includes predicted expenses 334 for a selected day 335. The daily expense allotment 332 includes food expenses, travel expenses, and other pre-approved additional expenses associated with each day in the set of training days the user attends the training event. For example, if expenses for food, travel, and lodging for a single day are estimated at one-hundred dollars, the daily expense allotment is one-hundred dollars.

In other examples, the daily expense allotment 332 is the total predicted expenses 334 divided by the total number of training days in the set of training days. In another example, the daily expense allotment 332 is the total predicted expenses 334 divided by the total number of days in the travel duration (travel days and training days).

In some examples, if the total predicted travel expenses and/or the daily expense allotment 332 cannot be authorized based on the threshold values, the authorization component 322 sends an authorization query 336 to a confirmation component on a remote computing device, such as the confirmation component 142 in FIG. 1. The authorization component 322 sends the authorization query 336 to the confirmation component executing on a remote computing device associated with a second user on condition the total predicted travel expenses exceed the threshold value. The authorization component 322 sends the authorization query 336 to the confirmation component via a communications interface component, such as the communications interface component 114 in FIG. 1.

If the predicted travel expenses exceed the threshold value and the authorization response 338 authorizing allocation of the predicted expenses is received from the confirmation component, the authorization component 322 authorizes allocation 328 of at least a portion of the predicted travel expenses. If the authorization response 338 is not received, allocation of the predicted travel expenses is unauthorized 344.

In some examples, the authorization component 322 determines whether to authorize allocation of the predicted travel expenses using a set of allocation rules 340. The set of allocation rules 340 includes rules for determining whether to automatically authorize an amount of predicted travel expenses for one or more days. In these examples, the set of allocation rules 340 includes one or more threshold(s) 342, such as a per-day maximum predicted travel expense threshold, a total predicted travel expense threshold, a maximum per day food expense threshold, a maximum per day travel expenses, etc.

For example, the set of allocation rules 340 include a rule stating that if a training event is taking place at a training location within a threshold distance from their home location, the user is not authorized to stay in a hotel or other overnight accommodation. In another example, the set of allocation rules 340 include a rule stating that if lunch is provided during each day of the training event, the predicted expenses only include funds for two meals a day (breakfast and dinner). Likewise, if the training event provides breakfast and lunch during each day of the training event, the predicted expenses are only authorized to include funds for a single meal (dinner) each day. However, if no meals are provided during the training, the predicted expenses can include funds to cover three meals per day.

Other allocation rules can include authorizing stay in a hotel if drive time is greater than one hour and fifteen minutes. Another rule can specify that travel expenses include travel expense equal to one round trip plus meals for each day in the set of training days. Another rule can specify that air travel is permitted if drive time is over five and a half hours. The travel expenses in this example includes cost of a rental car daily allotment for each day in the set of training days, a hotel room, and baggage fees two-way.

The set of allocation rules 340 can include rules for determining which expenses are authorized for a particular mode of travel. For example, if the selected mode of travel includes air travel, the allocation rules permit inclusion of fees for transportation to the airport, transportation from the airport, parking at the airport, luggage fees, etc. Transportation to and from the airport includes taxi cab fees, rental car fees, bus fare, airport shuttle fees, airport parking fees, and so forth.

If the mode of travel is a rental car, the expenses can include rental car fees, gas fees, ferry fees, toll road fees, etc. If the mode of travel is a personal car, the expenses can include gas, mileage, parking fees, toll road fees, ferry boat fees, etc.

In this manner, the customized travel expense component 134 pre-authorizes and pre-validates travel-related expenses for allocation to users attending a training event prior to the user incurring the expenses. In other examples, the customized travel expense component disburses funds on a selected day that are to be used for travel-related and training-related expenses predicted to be incurred on that selected day. In this manner, the system anticipates each day's expenses and provides funds to cover those expenses on the day that the funds are needed. This also prevents users from expending their own resources on travel-related expenses which would require reimbursement requests to be filed by the user. This improves accuracy of amounts provided for training-related expenses and increases convenience for users that no longer have to wait for reimbursement requests.

In some examples, the allocation component allocates funds for all travel and training related expenses at one time, including food, mileage/travel, and additional approved expenses. In other examples, the allocation component allocates funds on a daily basis to cover expenses for that day, including food and travel per diem expenses. In still other examples, the allocation component only allocates funds for meals. All other training and travel-related funds are allocated on the last day of the training event if the user attended all training activities the user was scheduled to attend. In yet other examples, the allocation component allocates funds for meals at the beginning of the day (morning) and allocates funds for lodgings and/or travel at the end of the training day if the user attended all travel for that day.

In one example, the verification component 314 utilizes data received from a debit card reader, a credit card reader, a user device, or any other approved network device in an Internet of things (IoT) to verify presence of the user at a training location or within a predetermined/preapproved range of the training location to authorize release of funds to the user. A preapproved or predetermined range of the training location can include a hotel room, conference room, or other space within a range of a designated training space.

The verification component in other examples utilizes a smart card or chip-enabled debit card linked to a user mobile device to verify presence of the user at a designated training event. In an example, a designated hotel hosting a training event includes or provides a network device, such as but not limited to a Wi-Fi router, that verifies the user's presence and communicates with the prepaid expense card (debit card) to unlock the chip.

In another example, a device in a conference room hosting the training event transmits a verification of the user's presence to the system to unlock/release funds allocated to the user. Thus, the verification of the user's presence can include any type of networked device for verifying the user's location capable. The networked device interacts with the user's travel card and/or user's account system (disbursement component) to validate disbursement of funds via the network, such as, but not limited to, the network 112 in FIG. 1.

In other examples, the allocation rules are utilized to determine what portion or amount of funds to allocate to each user/user account based on each user's unique circumstances/travel distance. In other words, a customized amount of funds is calculated and authorized for each user based on allocation rules and authorization of the customized amount for each user. However, the allocated and approved amount of funds are not released/provided to the user until release of funds are authorized in accordance with one or more disbursement rules, such as the set of disbursement rules 411 in FIG. 4 below.

Figure 4:
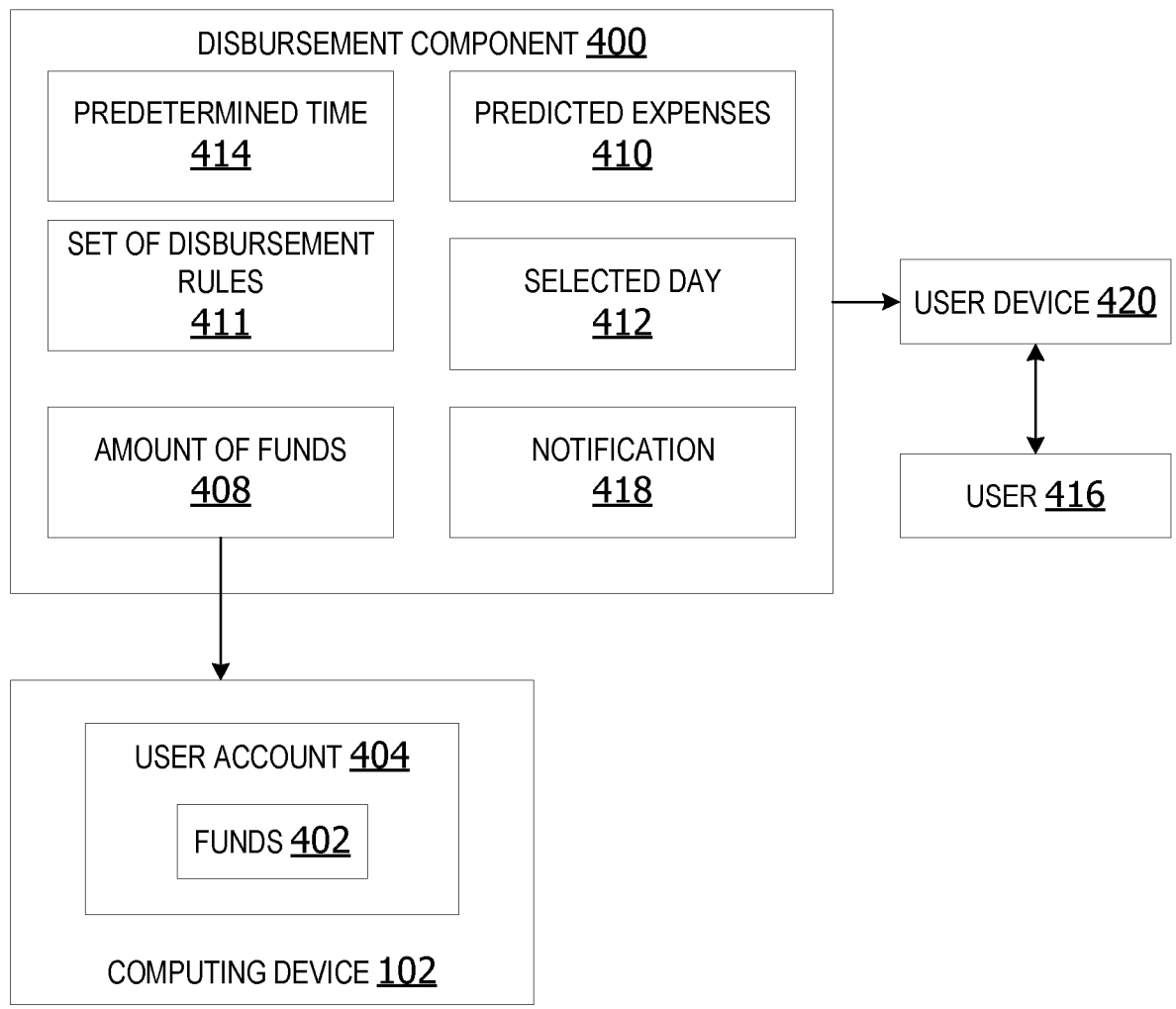
FIG. 4 is an exemplary block diagram illustrating an allocation component for uploading funds to a user account in real-time.

FIG. 4 is an exemplary block diagram illustrating a disbursement component 400 for disbursing allocated funds 402 to a user account 404 associated with a computing device 102 in real-time at an appropriate time based on confirmation of a user's presence at a training event and/or training location. The computing device 102 is a computing device managing one or more user travel card accounts, such as the user account 404.

The disbursement component 400 disburses an amount of funds 408 equivalent to at least a portion of predicted expenses 410 to the user account 404 upon confirmation of user presence at the training location in accordance with one or more rules in a set of disbursement rules 411.

The set of disbursement rules 411 include rules specifying where and when allocated and approved amount of funds are disbursed or released to the user for utilization. In an example, one rule in the set of disbursement rules 411 specifies that the approved daily expense allotment is only disbursed if a user's presence at a beginning (first day) of training is verified.

In another example, the disbursement rules specify that funds are only released on each day of the training if the user's presence at the training event is confirmed/verified for each day. In other words, if the user's attendance for the second day of training is unverified/unconfirmed, the funds allocated for the second day of training are not disbursed on the second day.

In some examples, the disbursement component 400 transfers the amount of funds 408 equivalent to a daily expense allotment for a selected day 412 to the user account 404 at a predetermined time 414 on the selected day 412 in the set of training days and/or on a travel day. The predetermined time 414 can be a same time each day for uploading the daily allocation of funds to cover expenses for a given day.

In an example, the daily allocation of funds is uploaded at seven o'clock in the morning each day in the set of training days. In other examples, the predetermined time 414 for disbursing the amount of funds 408 to the user is the end of the training classes/training events for a given day. In other examples, the predetermined time 414 is eight o'clock in the evening each day during the travel duration.

In other examples, the disbursement component 400 allocates funds equivalent to at least a portion of the total predicted travel expenses to the user account 404 for utilization by the user 416 during the training event. In some examples, the disbursement component 400 sends a notification 418 to a user device 420 associated with the user attending the training event. The notification 418 provides notice that the amount of funds 408 have been uploaded to the user account 404. This informs the user 416 when the funds 402 are available for utilization on each day during the training event.

In still other examples, the notification 418 provides notice to a user of failure to reload funds into the user's account due to failure to verify the user's attendance at a training class, failure to authorize funds, successful verification of the user's presence at the training event, notification of disbursement of funds to the user's account for a given days funds, and/or notification of disbursement of the total predicted expenses to the user's account.

In these non-limiting examples, the disbursement component applies one or more disbursement rules to data associated with a user's location and/or training attendance to determine whether to unlock the allocated and approved amount of funds to the user. The disbursement rules can include, without limitation, rules for releasing funds based on the verification of user presence at a training location, attendance of a training event, completion of one or more training classes, and/or other disbursement rules.

Figure 5:
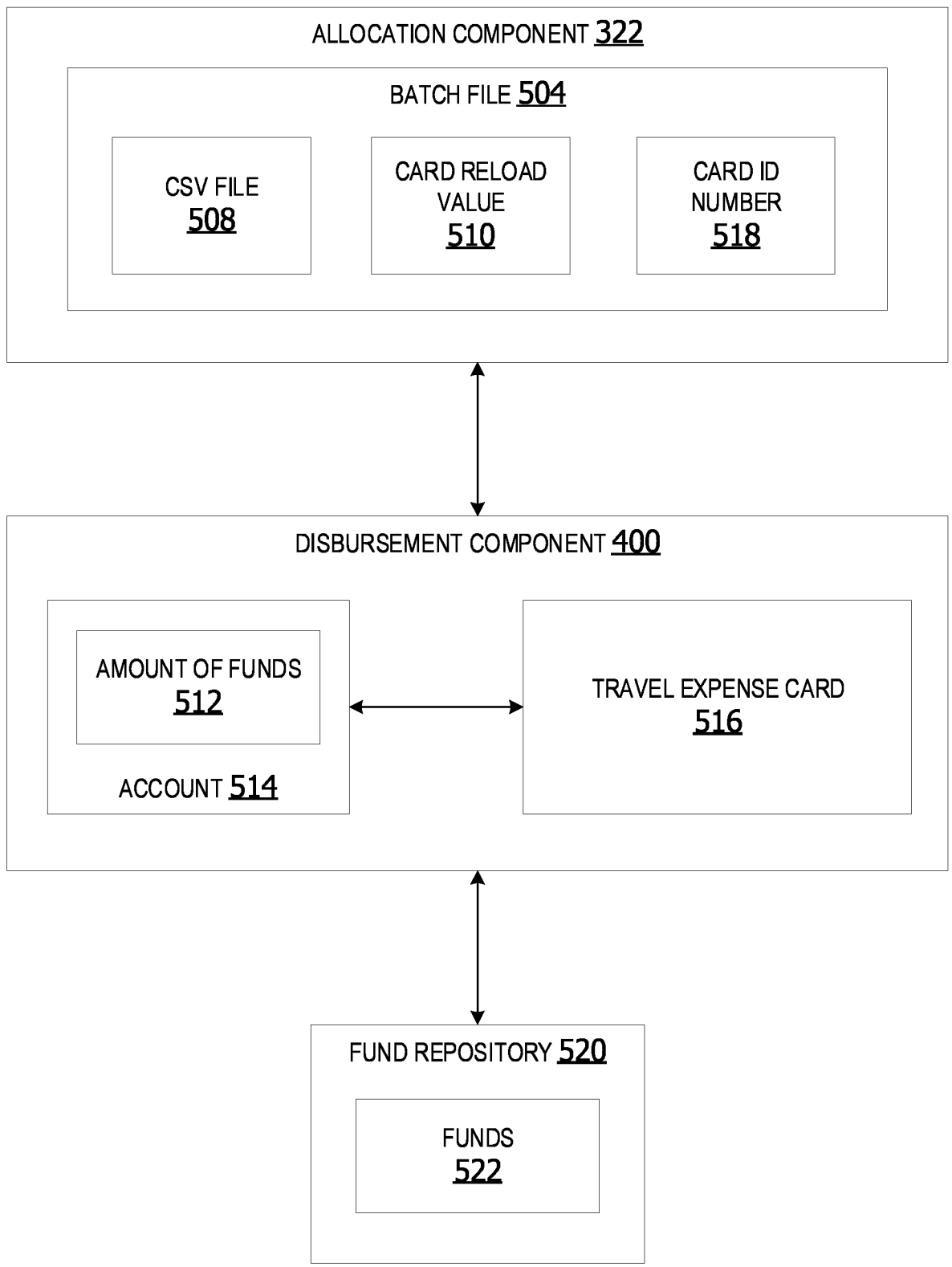
FIG. 5 is an exemplary block diagram illustrating a machine learning component.

FIG. 5 is an exemplary block diagram illustrating uploading of allocated funds to an account associated with a travel card. An authorization component 322 in some examples uploads a batch file 504 to a disbursement component 400. The batch file 504 includes at least one comma separated values (CSV) file 508. The batch file 504 includes a card reload value 510 specifying an amount of funds 512 to load onto a given account 514 associated with a travel card 516 assigned to a given user for utilization during a training event.

The batch file 504 can also include a card identification (ID) number 518 and a card identification (ID) number 518 for each travel card 516 in a plurality of travel cards associated with a plurality of users attending the training event. The disbursement component 400 utilizes the batch file 504 to load a first amount of funds 512 from a funds repository 520 to a first account 514 associated with a first travel card 516 assigned to a first user in the plurality of users. The disbursement component 400 utilizes card reload values provided in the batch file 504 to load a second amount of funds to a second account associated with a second travel card assigned to a second user in the plurality of users. The first amount of funds in this example is a different amount of funds than the second amount of funds.

The authorization component 322 in other examples reserves funds 522 sufficient to cover the total predicted travel expenses approved for each user attending the training event in the fund repository 520 prior to an occurrence of the training event. The funds are reserved for budgeting purposes.

On each day of the training event, a daily expense allotment sufficient to cover expenses for that particular day is uploaded from the fund repository to the account for each user on the day of the training event in other examples. Uploading funds refers to disbursing or releasing funds to the user for utilization by the user. In this manner, funds to cover training-related expenses are provided to the users for use on the day that the funds are actually to be used by the users. This eliminates/reduces the need for reimbursements while providing funds during the training event for utilization in real-time during the training event.

The disbursement component 400 in this example is executing on the same computing device as the expense allocation component. However, in other examples, the disbursement component is located on a different computing device from the allocation component.

In some examples, the batch files include a user ID, a proxy card number (dummy card number) to identify which travel card should be loaded, and/or total amount authorized for loading onto a given travel card. The funds can be direct deposited into the user account or added to a paycheck associated with the user. In this example, the authorized amount of funds is output from the customized travel expense component to a payment/paycheck component or pay application associated with the user.

Figure 6:
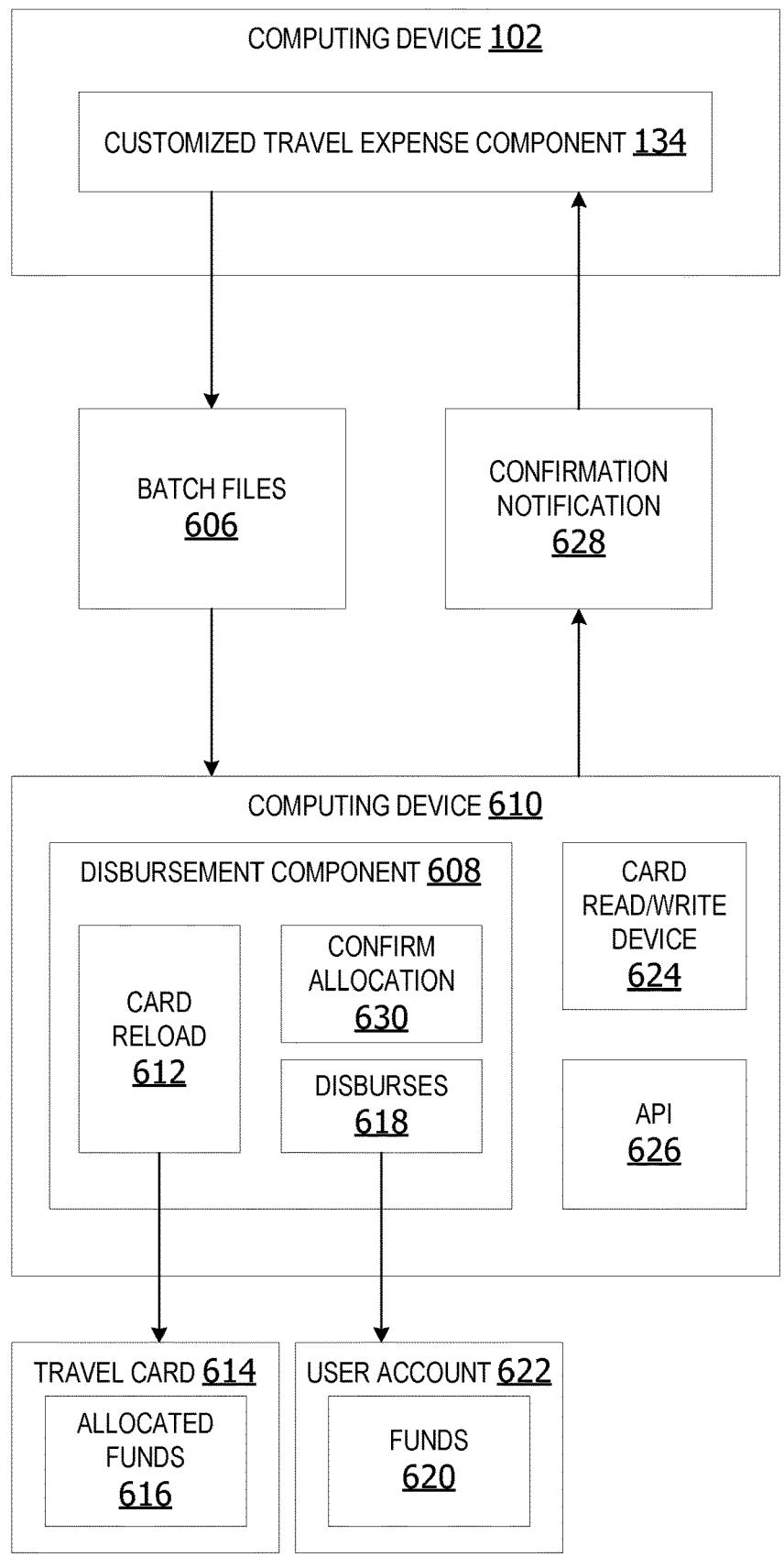
FIG. 6 is an exemplary block diagram illustrating uploading of allocated funds to an account associated with a travel card.

FIG. 6 is an exemplary block diagram illustrating a customized travel expense component for generating batch files utilized to reload travel cards. The customized travel expense component 134 executing on a first computing device 102 uploads a batch files 606 to a disbursement component 608 executing on a second computing device 610. The disbursement component 608 utilizes data in the batch files 606 to perform a card reload 612 of one or more travel cards. In some non-limiting examples, the disbursement component 608 receives the batch files 606 via an application programming interface (API) 626.

In some examples, the disbursement component 608 reloads a travel card 614 with allocated funds 616. The travel card 614 is a travel card, such as a prepaid credit card, a debit card, a gift card, cryptocurrency, a reward card, or any other type of card associated with funds in a user selected medium of exchange. The travel card 614 can be composed of paper, plastic, metal, or any other suitable material. The travel card 614 can include a magnetic strip, a microchip, a radio frequency identifier (RFID) tag, or other device for accessing funds in the account.

In some examples, funds are loaded onto a travel card or deducted from the travel card 614 via a card read/write device 624. The card read/write device 624 can include a bar code reader, a chip reader, a magnetic strip reader, a radio frequency identifier (RFID) tag reader, or any other device for reading data off a physical card, such as the travel card 614.

In other examples, the disbursement component 608 disburses 618 allocated funds 620 to a user account 622 associated with the travel card 614 in a user selected method of payment. The method of payment can include cash, credit, direct deposit, or funds loaded onto a prepaid card.

When the user utilizes the travel card, the funds 620 are deducted from the user account 622. In still other examples, the disbursement component 608 triggers a cash dispensing device to disburse the amount of funds to the user in cash, such as an automated teller machine (ATM) or another device.

The user account 622 in some examples is initially preloaded with an amount of funds sufficient to cover predicted expenses expected to be incurred by the user during travel to the remote location prior to commencement of the training event. The amount of funds includes funds to cover food expenses and travel expenses on a first day of travel to the remote location prior to arrival at the remote location. The funds allocated to the user to cover predicted expenses expected to be incurred by the user on a second day are loaded onto the user account 622 associated with the travel card 614 on the second day on condition that verification of the presence of the user at the remote location on the second day is received or verification that the user is on-route to the remote location as scheduled is received.

In some examples, the disbursement component 608 sends a confirmation notification 628 to the customized travel expense component 134 to confirm allocation 630 of the funds to the user account 622 for utilization via the travel card 614.

In other examples, the customized travel expense component outputs a notification to the user device associated with the user notifying the user that the funds have been disbursed to the user's account. If disbursement of the funds is not authorized/denied, the customized travel expense component outputs a denial notification to the user device.

Figure 7:
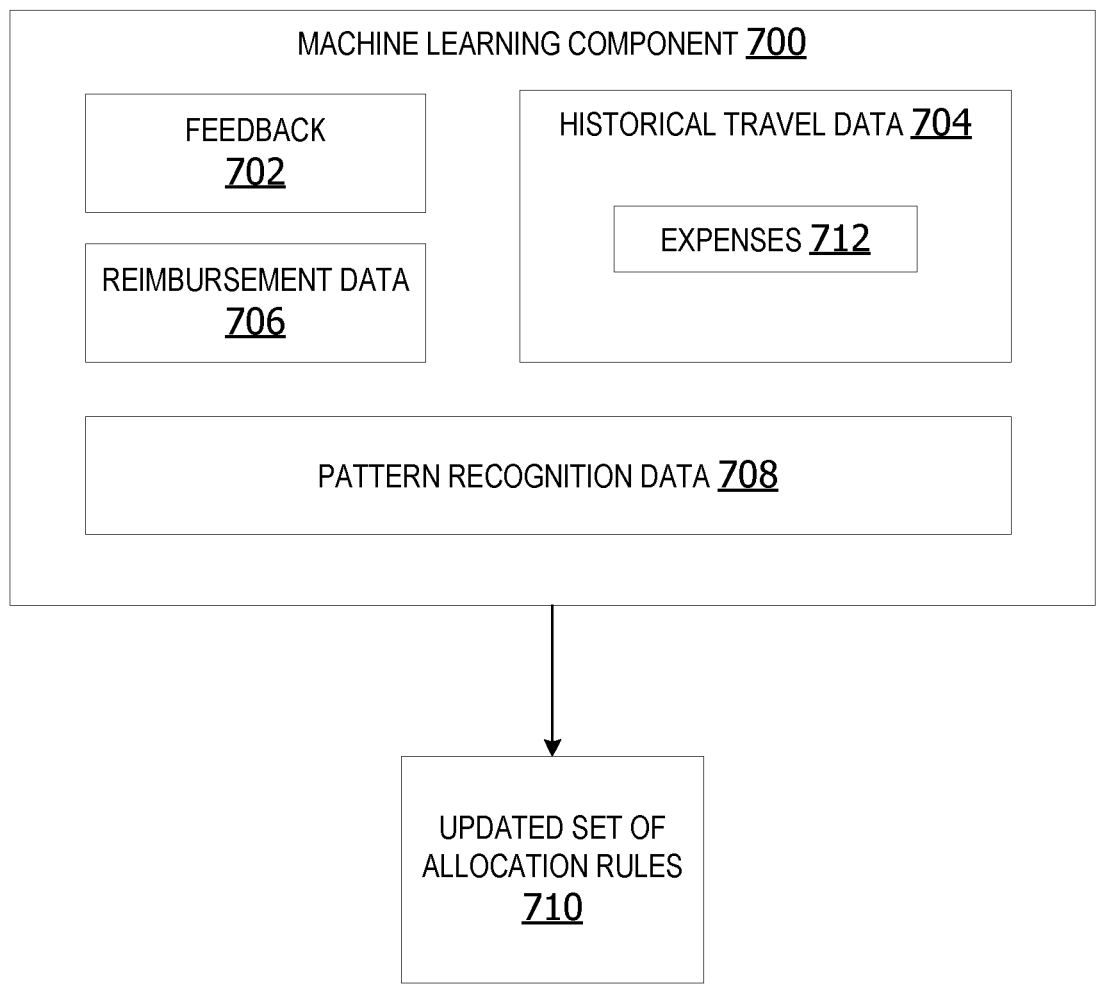
FIG. 7 is an exemplary block diagram illustrating a customized travel expense component for generating batch files utilized to reload travel cards.

FIG. 7 is an exemplary block diagram illustrating a machine learning component 700. The machine learning component 700 is an artificial intelligence capable of self-programming via machine learning.

The machine learning component 700 analyzes feedback 702 received from one or more users regarding adequacy of the funds allocated to the users for utilization during the training event. The feedback 702 can include supplemental requests for reimbursement of expenses incurred by a user during a training event and/or during travel to or from the training event, which were not covered by the disbursed amount of funds. Other feedback can include, without limitation, requests from users attending training and/or user's providing training regarding timing of disbursement, amount of daily expense allotments, etc. The feedback can indicate surplus funds allocated for meals or insufficient funds allocated for meals on a given day. In an example, if meals are purchased from an on-site food vendor for less than the allocated daily meal disbursement, the feedback indicates excessive funds allocated. Likewise, feedback can indicate funds are allocated too late in the day for breakfast purchase, etc.

The feedback 702 can be analyzed with historical travel data 704, reimbursement data 706, and pattern recognition data 708 to generate updated set of allocation rules 710. The historical travel data 704 includes data describing previous training events, travel by users to the event, and actual expenses 712 incurred by the users to attend these events. The reimbursement data 706 is data associated with reimbursements of expenses incurred by users.

The machine learning component 700 utilizes the feedback and other data to recognize patterns in expense generation, costs of travel, funds sufficient for daily meals at different locations, acceptable modes of travel, etc. The set of allocation rules 710 are updated/modify to adjust for feedback indicating insufficient funds were provided, excessive funds were provided, a selected mode of travel was preferred or not preferred, length of travel time via various modes of travel and different routes of travel, and so forth.

In this manner, the system becomes more efficient and more accurate at predicting duration of travel, selecting modes of travel, predicting total expenses for a training event, predicting expenses for each day of a training event, and/or predicting a most efficient/desirable predetermined time at which to disburse funds for utilization during each training day.

Figure 8:
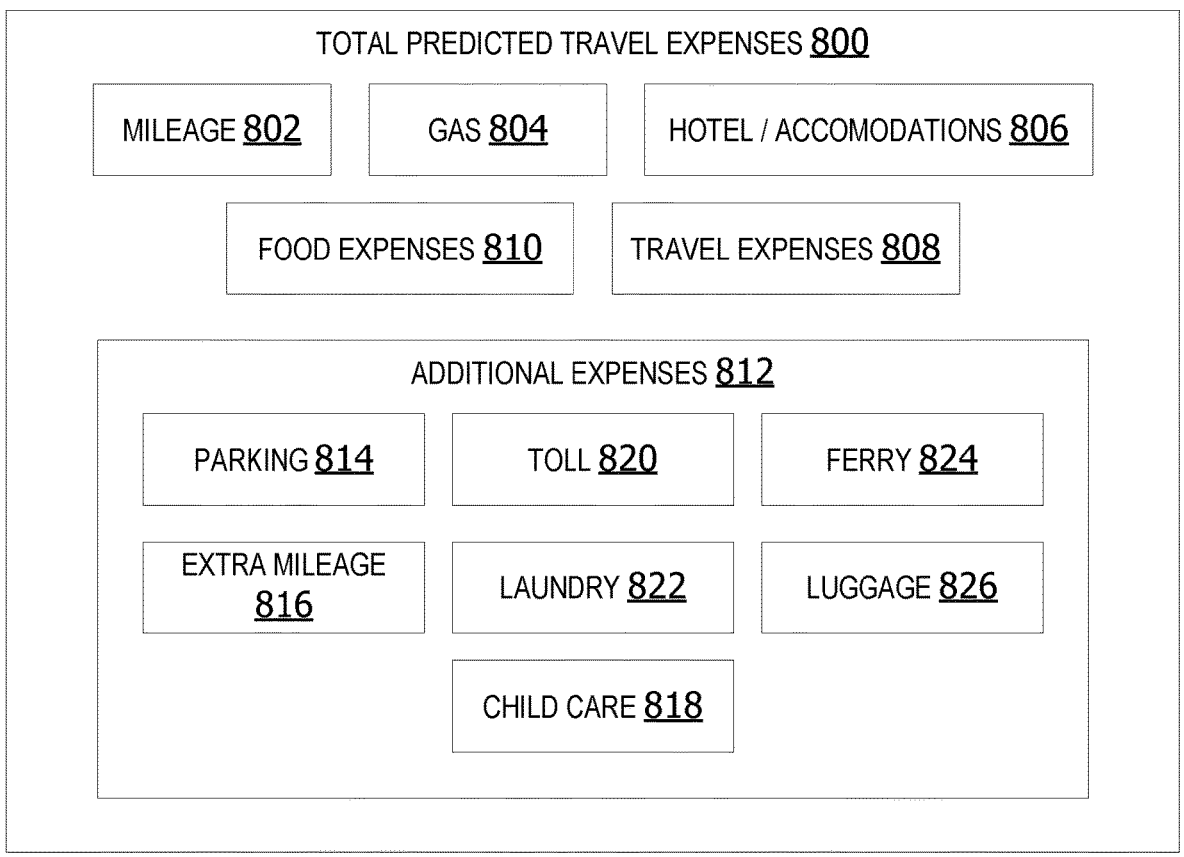
FIG. 8 is an exemplary block diagram illustrating total predicted travel expenses.

FIG. 8 is an exemplary block diagram illustrating total predicted travel expenses 800. The total predicted travel expenses 800 can include mileage 802 for travel via a personal vehicle, gas 804 for travel by personal vehicle, hotel/accommodations, 806 travel expenses 808, and/or food expenses 810 for each day the user is scheduled to attend the training event, as well as each day of travel time.

The total predicted travel expenses 800 can also include additional expenses 812. The additional expenses 812 are expenses requiring additional approval from a confirmation component. The additional expenses 812 can include, without limitation, parking 814, extra mileage 816, child care 818, toll 820 fees, laundry 822 costs, ferry 824 fees, and/or luggage 826 fees, such as baggage charges.

FIG. 9 is an exemplary block diagram illustrating a set of mode selection criteria 900. The set of mode selection criteria 900 includes rules for selecting a mode of travel customized for a user based on the travel route, dates of travel, duration of travel, distance between the point of departure and the destination, weather, current events, and any other data associated with the planned training schedule.

In an illustrative example, the set of mode selection criteria 900 indicates that if the distance between the first location and the remote location is less than sixty miles, the mode of travel is a personal car or other personal vehicle 902. If the distance is greater than or equal to sixty miles, the selected mode of travel is a rental car 904. In another example, if a total travel distance is greater than or equal to three-hundred miles, the selected mode of travel is air travel 906, such as a commercial airline. Thus, if the user is driving less than sixty miles, the user cannot utilize a rental car, instead the user has to use their own car.

In other examples, the set of mode selection criteria includes rules for selecting a mode of travel based on travel time. In an example, the set of mode selection criteria 900 includes a rule stating that if total predicted travel time by car is five hours or less, the selected mode of travel is by personal car or rental car. If the total predicted travel time is greater than or equal to five hours, the set of mode selection criteria 900 specifies travel by air travel. In other examples, the set of mode selection criteria specifies travel by passenger train, ship, bus, or any other mode of travel. The ranges of distance and time used herein are for illustrative purposes only and are not intended to limit aspects of the disclosure in any way. Any suitable range or configuration is contemplated by aspects of this disclosure.

Figure 10:
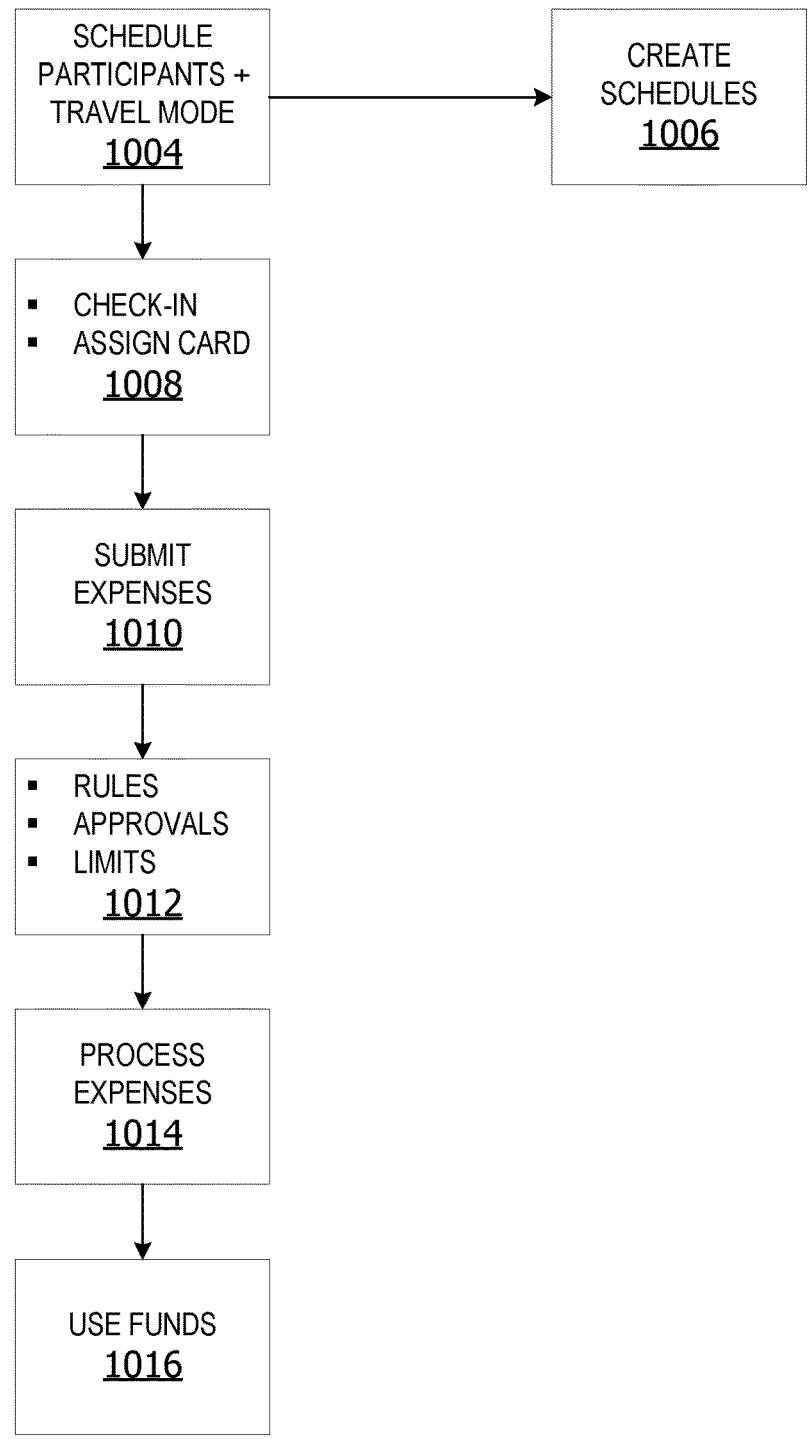
FIG. 10 is an exemplary block diagram illustrating a customized travel expense allocation process.

FIG. 10 is an exemplary block diagram illustrating a customized travel expense allocation process 1000 performed by a customized travel expense component 134. The customized travel expense component 134 schedules users to attend a training event and selects a mode of travel at 1004. The customized travel expense component 134 creates one or more travel schedules at 1006. The customized travel expense component 134 performs a user check-in at the remote training location and assigns a travel card to each user at 1008. The customized travel expense component 134 submits predicted expenses at 1010. The customized travel expense component 134 utilizes a set of allocation rules to approve allocation of the predicted expenses and apply limits 1012 to the amounts of funds allocated to each user customized travel expense component 134 processes the approved expenses 1014 and loads the approved amounts of funds onto a user account. The user utilizes the funds 1016 to cover expenses incurred during the training event at 1016.

Figure 11:
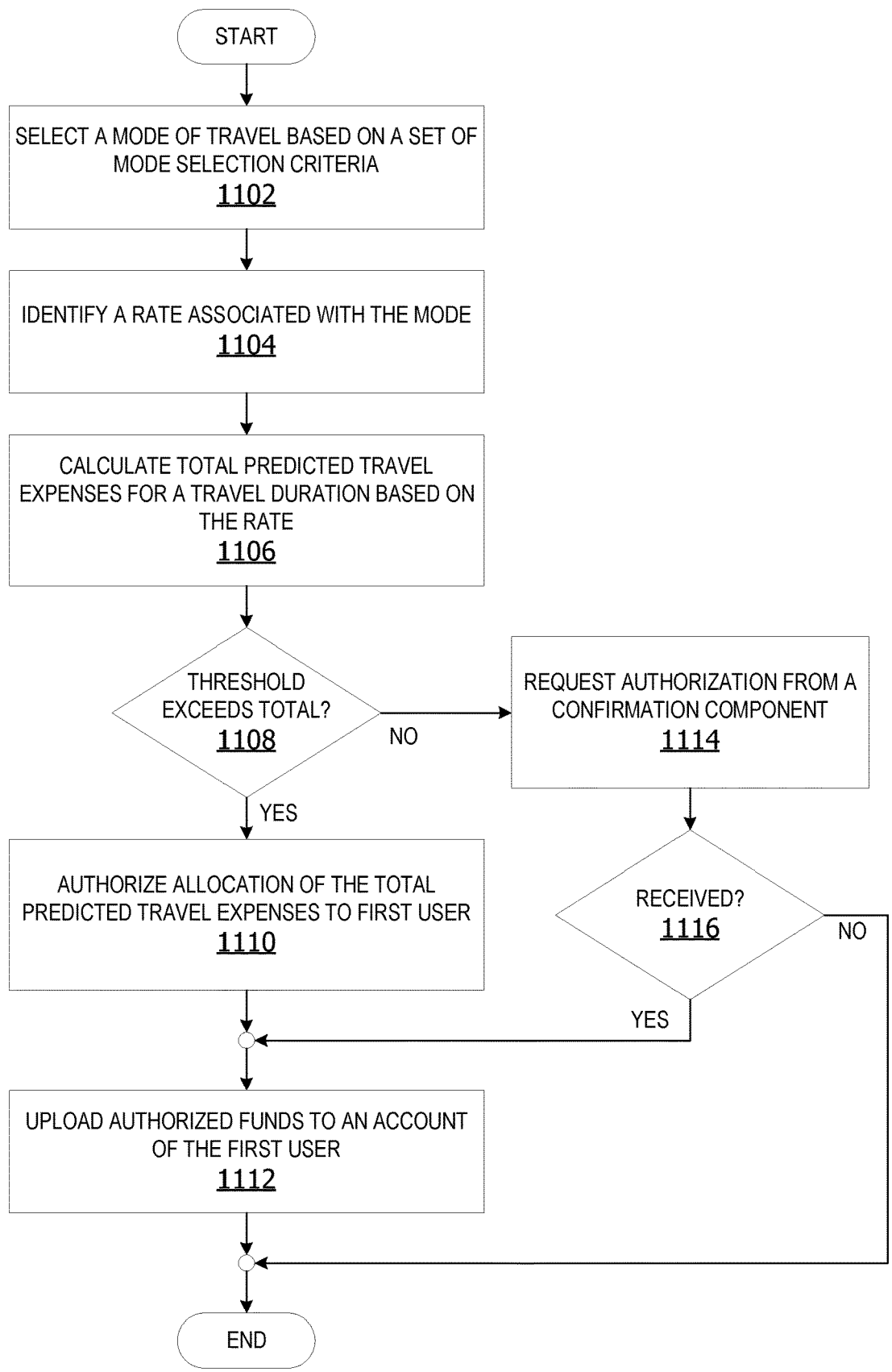
FIG. 11 is an exemplary flow chart illustrating operation of the computing device to upload customized amounts of travel expense funds to a user account.

FIG. 11 is an exemplary flow chart illustrating operation of the computing device to upload customized amounts of travel expense funds to a user account. The process shown in FIG. 11 can be performed by a customized travel expense component, executing on a computing device, such as the computing device 102 in FIG. 1.

The process begins by selecting a mode of travel based on a set of mode selection criteria at 1102. The set of mode selection criteria includes rules for selecting a mode of travel based on duration of travel, travel route, and/or length of travel time, such as a set of mode selection criteria 218 in FIG. 2 and the set of mode selection criteria 900 in FIG. 9.

The customized travel expense component identifies a rate associated with the mode at 1104. The customized travel expense component calculates total predicted travel expenses for a travel duration based on the rate at 1106. The customized travel expense component decides whether a threshold exceeds the total predicted travel expenses at 1108. If yes, the customized travel expense component authorizes allocation of the total predicted travel expenses to the user at 1110. The customized travel expense component uploads the authorized funds to an account of the first user at 1112. The process terminates thereafter.

Returning to 1108, if the total predicted travel expenses exceed the threshold, the customized travel expense component requests authorization form a confirmation component at 1114. The customized travel expense component determines whether authorization is received at 1116. If no, the process terminates thereafter.

If the authorization is received at 1116, the customized travel expense component uploads the authorized funds to an account of the first user at 1112. The process terminates thereafter.

While the operations illustrated in FIG. 11 are performed by a computing device, aspects of the disclosure contemplate performance of the operations by other entities. In a non-limiting example, a cloud service performs one or more of the operations.

Figure 12:
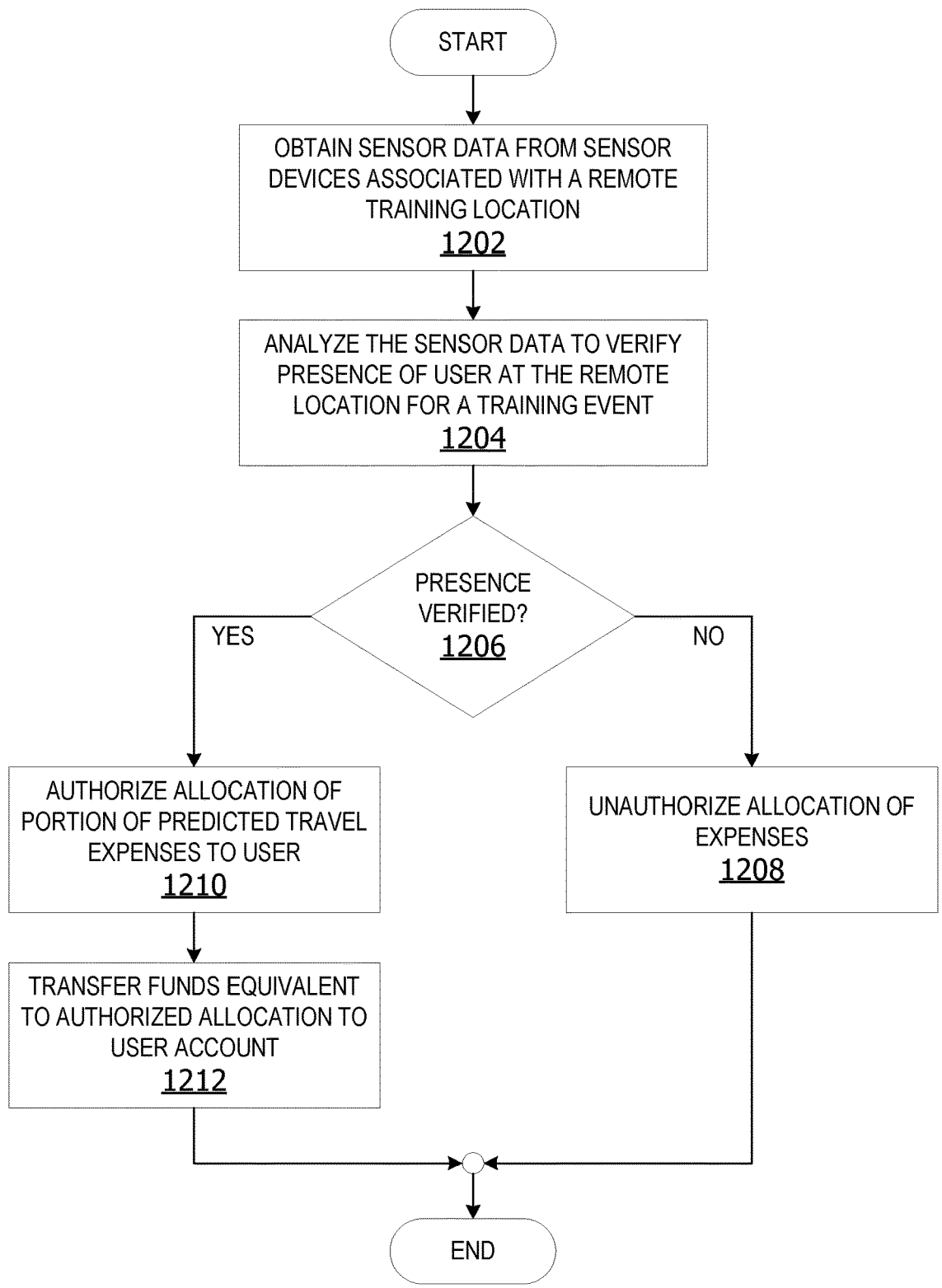
FIG. 12 is an exemplary flow chart illustrating operation of the computing device to verify user presence at a training event for expense allocation authorization.

FIG. 12 is an exemplary flow chart illustrating operation of the computing device to verify user presence at a training event for expense allocation authorization. The process shown in FIG. 12 is performed by a customized travel expense component, executing on a computing device, such as the computing device 102 in FIG. 1.

The process begins by obtaining sensor data from sensor devices associated with a remote training location at 1202. The sensor data is data received from sensor devices, such as, but not limited to, the set of sensor devices 118 in FIG. 1. The customized travel expense component analyzes the sensor data to verify a presence of the user at the remote location for a training event at 1204. The customized travel expense component determines whether a presence of the user is verified at 1206. If yes, the customized travel expense component authorizes allocation of a portion of predicted travel expenses to the user at 1210. The customized travel expense component transfers funds equivalent to the authorized allocation to a user account at 1212. The process terminates thereafter.

Returning to 1206, if the user's presence is not verified, the customized travel expense component un-authorizes allocation of expenses at 1208. The process terminates thereafter.

While the operations illustrated in FIG. 12 are performed by a computing device, aspects of the disclosure contemplate performance of the operations by other entities. In a non-limiting example, a cloud service performs one or more of the operations.

Figure 13:
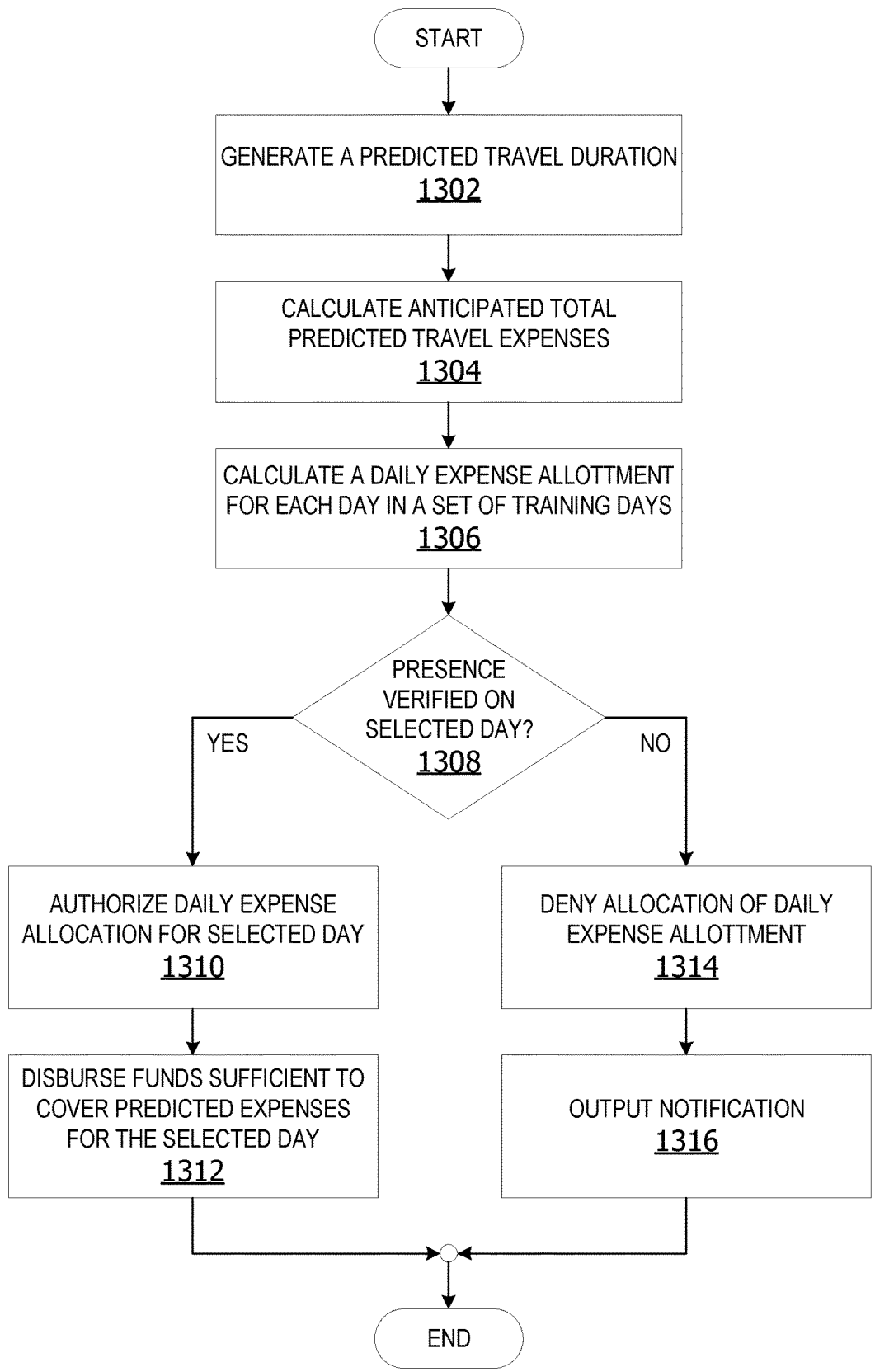
FIG. 13 is an exemplary flow chart illustrating operation of the computing device to disburse funds sufficient to cover daily expenses on each day of a training event.

FIG. 13 is an exemplary flow chart illustrating operation of the computing device to disburse funds sufficient to cover daily expenses on each day of a training event. The process shown in FIG. 13 is performed by a customized travel expense component, executing on a computing device, such as the computing device 102 in FIG. 1.

The process begins by generating a predicted travel duration at 1302. The customized travel expense component calculates anticipated total predicted travel expenses at 1304. The customized travel expense component calculates a daily expense allotment for each day in a set of training days at 1306. The customized travel expense component determines whether the user's presence at the training location is verified on a selected data at 1308. If yes, customized travel expense component authorizes the daily expense allocation for the selected day at 1310. The customized travel expense component disburses funds sufficient to cover predicted expenses for the selected day at 1312. The process terminates thereafter.

Returning to 1308, if the user's presence is unverified, the customized travel expense component denies allocation of daily expense allotment at 1314. The customized travel expense component outputs a notification of the denial at 1316. The process terminates thereafter.

While the operations illustrated in FIG. 13 are performed by a computing device, aspects of the disclosure contemplate performance of the operations by other entities. In an example, a cloud service performs one or more of the operations.

FIG. 14 is an exemplary diagram illustrating a batch file 1400. The batch file 1400 in this non-limiting example includes an initial amount of funds of $398.98 at 1402. The initial amount can be loaded prior to commencement of the training event or on a first day of the training event to cover expenses associated with traveling to the training location and covering meal expenses for the first travel day.

The portion 1404 of the batch file 1400 includes a reload amount of $250.75 to be reloaded into a user account associated with a travel card for utilization on a second day during the duration of travel.

FIG. 15 is an exemplary screenshot 1500 of a verification of funds request. The screenshot 1500 is a non-limiting example of a verification of funds request output to a user via a travel application running on a user device associated with the user attending a training. The screenshot 1500 is just one example of a funds verification. A verification of funds is not limited to the text or format shown in FIG. 15.

Additional Examples

In some examples, the system provides prepaid travel expenses customized for each unique user. The system calculates travel expenses to pre-load a travel card for a user. The system determines the location of the user and triangulates the location of a training facility to calculate mileage, per-diem food costs, and/or other anticipated travel expenses. The system preloads the travel card with training funds for utilization in a training program provided at the training facility. The user utilizes the funds loaded onto the card for a training program provided in the training facility.

In an example scenario, an EXCEL® Macro scans through store locations (Latitude and Longitude) using a mapping application to obtain the actual driving distance and travel time by road via a car or other vehicle. The obtained travel data, including the distance and travel time, is uploaded to an application, such as QuickBase, to align with a selected store location. This application triangulates the location of the user to a designated training facility. The system calculates travel expenses, such as mileage and per diem food costs.

In some examples, the travel expenses include additional pre-approved expenses, such as tolls, extra mileage, laundry, check-in luggage expense, car/garage parking fees, airport parking fees, public transportation, private transportation, rental car costs, and/or child care expenses. These additional expenses are approved by the system on a per-user basis. The pre-paid expenses and/or reimbursable expenses are loaded into the user's account.

The application, in this non-limiting example, generates a batch file, such as, a Comma Separated Values (CSV) file, to be uploaded into another system to load the funds for the user from a source of funds, such as a bank, which has the Academy Funds. The tool populates this batch of all participants with their expenses based on the proctor numbers for prepaid travel cards/credit cards entered for each user. Each user collects their respective cards on the day of classes at the training facility by verifying the amounts received and signing a verification form which is generated and saved in the application.

In some examples, the customized travel expense component pre-calculates the expenses needed for traveling to attend training and other work-related events at a remote location from the employees' regular workplace. The customized travel expense component selects an appropriate mode of travel, predicts travel time to and from the training location, and predicts an amount of funds required to cover expenses likely to be incurred for meals, travel, and boarding during the duration of the training. This predicted amount of funds is provided to employees to cover travel-related expenses before the expenses are incurred.

The customized travel expense component in other examples identifies an associate authorized to attend a training at a specific location, calculates the distance from the associate's home to the training location, predicting an amount of expenses associated with travel and attending training, and pre-loads that amount onto an account associated with the user for utilization during the training. In this manner, the customized travel expense component identifies which users are attending trainings at which location and pre-calculates the expenses accurately (pre-paid expenses) so reimbursement is eliminated or minimized. The customized travel expense component pre-calculates, and pre-pays predicted expenses that would previously have been reimbursement expenses (i.e. meals, mileage).

The pre-paid travel card in some examples is a custom card contracted with one or more financial services providers to limit the amount of personal information associated with the cards. The pre-paid travel card in other examples is only usable during the training event and/or only usable at the training location. In still other examples, only the customized travel expense component is capable of loading or reloading the travel card. The user can utilize the card to cover expenses, but the user cannot reload it.

In other examples, the customized travel expense component retains an identification of users attending training classes, when they attended, how they traveled to the training classes. The customized travel expense component pre-pays/loads the predicted amount of expenses based on the user's attendance, dates of attendance, distance traveled, mode of travel, and other pre-authorized expenses. In one non-limiting example, the customized travel expense component obtains information about which users are assigned to attend which training and where the training is located. The calculation component performs all the calculations and sends the calculated expenses to an authorization/validation application.

A funds repository, such as but not limited to, a banking system or other third-party vendor, receives authorized/pre-approved allocation amounts from the customized travel expense component. The funds repository in this non-limiting example loads pre-paid cards remotely for each user attending the training In one non-limiting example, the customized travel expense component performs scheduling, information collection, and alignment with allocation parameters via the selection component, which includes an application, such as, but not limited to, QUICKBOOKS®. The calculation component, including an expense application, performs all of the formal calculations driven off the data received from the selection component. In other examples, the customized travel expense component pushes calculation information direct to the card management component, which loads the travel cards.

If a user experiences unexpected delays or an unplanned increase in mileage due to traffic, an accident, road closure, road detours, and/or construction, the user can submit a request for additional expenses via the travel application running on the user device. If approved, the customized travel expense component loads funds sufficient to cover any approved additional expenses into the user's account.

The customized travel expense component in one example, sends output to the funds repository in an encrypted file format via an API of the card management component. The card management component processes the data and sends back additional information confirming the amount of funds loaded onto a travel card account or notification if an error occurred preventing loading of the approved funds.

In some examples, the customized travel expense component calculates total predicted expenses for a training but only preload/pre-pays funds to cover daily meal expenses during the training event. The customized travel expense component calculates a per diem meal expense amount.

In another example, mileage and other travel expenses are loaded into the user's account after attendance at a training event is verified/after the training event is concluded. In another example, the travel and other non-meal expenses are disbursed to users on a daily basis at the end of each training day. If the user attends training for that day, the user is allocated a per diem travel/other expense amount after that days training is concluded and the user is verified as having attended all the training classes for that day.

In one examples, the customized travel expense component pre-calculates all expenses for a training period (i.e. 4-day class) and pre-loads the total amount of the predicted expenses into the user's account.

The customized travel expense component in another example pre-calculates of all expenses for a training period (i.e. 4-day class), breaks-out portions of the total expense based on a rule set (i.e. pre-load meal portion daily at the beginning of the day, load mileage portion daily at the end of the day based on verification that associated attended whole day of training, load hotel/rental portion at end of the 4-day training based on verification that associate attended whole course).

The system can use location tracking to determine whether to authorize disbursement/loading of funds onto a travel expense card. The system can also provide digital payment for approved funds allocated to a user for a specific day or other time period. The system utilizes different payment methods, such as, but not limited to, digital payment, for disbursing allocated funds to a user for a specific day or other time-period. Additional control parameters are used to avoid fraud, such as the location awareness, biometric scanning to verify identify of user, third-party verification of user's presence at a training location, etc.

Alternatively, or in addition to the other examples described herein, examples include any combination of the following:
the verification component, implemented on the at least one processor, that sends an attendance verification query to a user device associated with a training manager;
wherein the verification component verifies the presence of the user at the remote location for at least the portion of the training event on condition a verification is received from the training manager;
wherein the verification component unauthorizes allocation of at least a portion of the total predicted travel expenses to the user on condition the verification component fails to receive the verification from the training manager;
a disbursement component, implemented on the at least one processor, that automatically transfers an amount of funds equivalent to the authorized allocation to the account corresponding to the card associated with the user for utilization by the user during the training event at the remote location;
wherein the authorized allocation to the account comprises transfer of an amount of funds equivalent to a daily expense allotment to the account at a predetermined time on each day in the set of training days;
wherein the daily expense allotment comprises food expenses, travel expenses, and other pre-approved additional expenses associated with each day in the set of training days the user attends the training event;
the allocation component, implemented on the at least one processor, that uploads a batch file to a disbursement component, the batch file comprising at least one comma separated values file including a card reload value and a card identification number for each travel card in a plurality of travel cards associated with a plurality of users attending the training event;
wherein the disbursement account utilizes the batch file to load a first amount of funds from a funds repository to a first account associated with a first travel card assigned to a first user in the plurality of users and load a different second amount of funds to a second account associated with a second travel card assigned to a second user in the plurality of users;
the analysis component, implemented on the at least one processor, that analyzes geolocation data generated by a global positioning sensor device associated with the user device assigned to the user to verify the presence of the user at the remote location on a given day prior to disbursing a daily expense allotment from the total predicted travel expenses to the user for utilization on that given day;
a machine learning component, implemented on the at least one processor, that obtains expense allocation feedback from at least one user and analyzes the feedback with historical travel data and reimbursement data using pattern recognition data to generate an updated set of allocation rules;
wherein the updated set of allocation rules are utilized by the allocation component to calculate an amount of funds to disburse to the user on each day within the travel duration;

the allocation component, implemented on the at least one processor, that reserves the total predicted travel expenses for each user attending the training event prior to an occurrence of the training event;

the account initially preloaded with an amount of funds sufficient to cover predicted expenses expected to be incurred by the user during travel to the remote location prior to commencement of the training event;

wherein the amount of funds comprises funds to cover food expenses and travel expenses on a first day of travel to the remote location prior to arrival at the remote location;

wherein funds allocated to the user to cover predicted expenses expected to be incurred by the user on a second day are loaded onto the account associated with the travel card on the second day on condition that verification of the presence of the user at the remote location on the second day is received or verification that the user is on-route to the remote location as scheduled is received;

the calculation component, implemented on the at least one processor, that sends an authorization request to a user device associated with a training manager to authorize additional expenses associated with the selected mode, the additional expense comprises at least one of parking fees, toll fees, ferry costs, extra mileage, laundry costs, luggage fees, or child care expenses;

analyzing, by an analysis component, sensor data generated by a set of sensor devices associated with a first user device assigned to the user to verify a presence of the user at the remote location for at least a portion of a given day in the set of training days;

wherein a daily pro-rata portion of the total predicted travel expenses is disbursed to the user on each day in the set of days in which the presence of the user at the remote location for at least a portion of the training event is verified;

wherein the daily pro-rata portion of the total predicted travel expenses remains undisbursed to the user if the presence of the user at the remote location on a given training day is unverified;

analyzing, by an allocation component, the total predicted travel expenses using a set of allocation rules to identify an amount of funds sufficient to cover predicted expenses associated with a selected day;

wherein the disbursement component uploads the identified amount of funds to the account at a predetermined time on the selected day;

wherein the total predicted travel expenses are disbursed to the user at a conclusion of a last training session on a last day of training at the remote location on condition attendance of all training sessions by the user is verified;

wherein the total predicted travel expenses are disbursed to the user on a first day of travel prior to a beginning of a first training session associated with the training event at the remote location;

uploading a batch file to the disbursement component, the batch file comprising at least one comma separated values file including a card reload value and a card identification number for each account assigned to each user in a plurality of users scheduled to attend the training event at the remote location;

wherein the disbursement component utilizes the batch file to load a first amount of funds from a funds repository to a first account assigned to a first user in the plurality of users and load a different second amount of funds to a second account assigned to a second user in the plurality of users;

sending a notification to a first user device associated with the first user notifying the user of disbursement of the funds to the user account;

wherein a denial notification is sent to the first user device and a second user device associated with a training manager on condition of a failure to authorize allocation of the total predicted travel expenses to the first user;

the allocation component, implemented on the at least one processor, that uploads a batch file to a disbursement component, the batch file comprising at least one comma separated values file including a card reload value and a card identification number for each user in a plurality of users attending the training event;

wherein the disbursement component utilizes the batch file to load funds from a funds repository to an account associated with a travel card assigned to each user in the plurality of users; and the analysis component, implemented on the at least one processor, that analyzes geolocation data generated by a global positioning sensor device associated with the user device assigned to the user to verify the presence of the user at the remote location on a given day prior to disbursing a daily expense allotment for the given day to the user.

At least a portion of the functionality of the various elements in FIG. 1, FIG. 2, FIG. 3, FIG. 4, FIG. 5, FIG. 6, FIG. 7, FIG. 8, and FIG. 9 can be performed by other elements in FIG. 1, FIG. 2, FIG. 3, FIG. 4, FIG. 5, FIG. 6, FIG. 7, FIG. 8, and FIG. 9, or an entity (e.g., processor 106, web service, server, application program, computing device, etc.) not shown in FIG. 1, FIG. 2, FIG. 3, FIG. 4, FIG. 5, FIG. 6, FIG. 7, FIG. 8, and FIG. 9.

In some examples, the operations illustrated in FIG. 11, FIG. 12, and FIG. 13 are implemented as software instructions encoded on a computer readable medium, in hardware programmed or designed to perform the operations, or both. In some examples, aspects of the disclosure are implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH" as used herein refers, in some examples, to a wireless technology standard for exchanging data over short distances using short wavelength radio transmission. The term "cellular" as used herein refers, in some examples, to a wireless communication system using short-range radio stations that, when joined together, enable the transmission of data over a wide geographic area. The term "NFC" as used herein refers, in some examples, to a short-range high frequency wireless communication technology for the exchange of data over short distances.

While no personally identifiable information is tracked by aspects of the disclosure, examples have been described with reference to data monitored and/or collected from the users. In some examples, notice is be provided to the users of the collection of the data (e.g., via a dialog box or preference setting) and users are given the opportunity to give or deny consent for the monitoring and/or collection. The consent takes the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations suitable for use with aspects of the disclosure include, but are not limited to, mobile computing devices, personal computers, server computers, handheld or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices accept input from the user in any way, including from input devices such as a keyboard or pointing device, via gesture input, proximity input (such as by hovering), and/or via voice input.

Examples of the disclosure described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform particular tasks or implement particular abstract data types. Aspects of the disclosure can be implemented with any number and organization of such components or modules. For example, aspects of the disclosure are not limited to the specific computer-executable instructions or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for customizing travel expense allocations. For example, the elements illustrated in FIG. 1, FIG. 2, FIG. 3, FIG. 4, FIG. 5, FIG. 6, FIG. 7, FIG. 8, and FIG. 9, such as when encoded to perform the operations illustrated in FIG. 11, FIG. 12, and FIG. 13, constitute exemplary means for selecting a mode of travel for a first user scheduled to attend a training event provided at a remote location from the first user based on a set of mode selection criteria and a selected route between a home location associated with the first user and the remote location; exemplary means for calculating total predicted travel expenses anticipated to be incurred by the first user during a predicted travel duration based on a rate associated with the selected mode; exemplary means for authorizing allocation of the calculated total predicted travel expenses to the first user on condition a threshold value exceeds the total predicted travel expenses; exemplary means for obtaining authorization of at least a portion of the calculated total predicted travel expenses for allocation to the first user from an authorization component executing on a remote computing device associated with a second user on condition the total predicted travel expenses exceed the threshold value; and exemplary means for uploading funds equivalent to at least a portion of the total predicted travel expenses to an account associated with the first user for utilization by the first user during the training event.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there can be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for customizing travel expense allocations, the system comprising:
   a memory;
   at least one processor communicatively coupled to the memory;
   an account corresponding to a travel card associated with a user;
   a set of sensor devices associated with a remote training location;

a selection component, implemented on the at least one processor, that selects a mode of travel based on a set of mode selection criteria and training schedule data associated with a training event the user is scheduled to attend at the remote training location during a future time-period, including a selected route between a first location and the remote training location;

a calculation component, implemented on the at least one processor, that calculates total predicted travel expenses to be incurred by the user during a travel duration based on the selected mode and a rate associated with the selected mode, the travel duration comprising a set of training days associated with the training event and predicted round-trip travel time corresponding to the selected route;

a verification component, implemented on the at least one processor, that verifies a presence of the user at the remote location for at least a portion of the training event based on an analysis of sensor data obtained from the set of sensor devices;

an authorization component, implemented on the at least one processor, that authorizes allocation of at least a portion of the total predicted travel expenses to the user on condition of attendance verification and unauthorizes allocation of at least the portion of the total predicted travel expenses on condition of a failure to verify attendance; and an allocation component, implemented on the at least one processor, that disburses an amount of funds equivalent to at least the portion of the total predicted travel expenses to a user account.

2. The system of claim 1, further comprising:
the verification component, implemented on the at least one processor, that sends an attendance verification query to a user device associated with a training manager, wherein the verification component verifies the presence of the user at the remote location for at least the portion of the training event on condition a verification is received from the training manager, and wherein the verification component unauthorizes allocation of at least the portion of the total predicted travel expenses to the user on condition the verification component fails to receive the verification from the training manager.

3. The system of claim 1, further comprising:
the allocation component, implemented on the at least one processor, that transfers of the amount of funds equivalent to a daily expense allotment to the account at a predetermined time on each day in the set of training days, wherein the daily expense allotment comprises food expenses, travel expenses, and other pre-approved additional expenses associated with each day in the set of training days the user attends the training event.

4. The system of claim 1, further comprising:
the allocation component, implemented on the at least one processor, that uploads a batch file to a disbursement component, the batch file comprising at least one comma separated values file including a card reload value and a card identification number for each travel card in a plurality of travel cards associated with a plurality of users attending the training event, wherein the disbursement component utilizes the batch file to load a first amount of funds from a funds repository to a first account associated with a first travel card assigned to a first user in the plurality of users and load a second amount of funds to a second account associated with a second travel card assigned to a second user in the plurality of users.

5. The system of claim 1, further comprising:
an analysis component, implemented on the at least one processor, that analyzes geolocation data generated by a global positioning sensor device associated with a user device assigned to the user to verify the presence of the user at the remote location on a given day prior to disbursing a daily expense allotment from the total predicted travel expenses to the user for utilization on the given day.

6. The system of claim 1, further comprising:
a machine learning component, implemented on the at least one processor, that obtains expense allocation feedback from at least one user and analyzes the feedback with historical travel data and reimbursement data using pattern recognition data to generate an updated set of allocation rules, wherein the updated set of allocation rules are utilized by the allocation component to calculate an amount of funds to disburse to the user on each day within the travel duration.

7. The system of claim 1, further comprising:
the allocation component, implemented on the at least one processor, that reserves the total predicted travel expenses for each user attending the training event prior to an occurrence of the training event.

8. The system of claim 1, further comprising:
the account initially preloaded with an amount of funds sufficient to cover predicted expenses expected to be incurred by the user during travel to the remote location prior to commencement of the training event, wherein the amount of funds comprises funds to cover food expenses and travel expenses on a first day of travel to the remote location prior to arrival at the remote location, wherein funds allocated to the user to cover predicted expenses expected to be incurred by the user on a second day are loaded onto the account associated with the travel card on the second day on condition that verification of the presence of the user at the remote location on the second day is received or verification that the user is on-route to the remote location as scheduled is received.

9. The system of claim 1 further comprising:
the calculation component, implemented on the at least one processor, that sends an authorization request to a user device associated with a training manager to authorize inclusion of additional expenses associated with the selected mode in the total predicted travel expenses, the additional expense comprises at least one of parking fees, toll fees, ferry costs, extra mileage, laundry costs, luggage fees, or child care expenses.

10. A system for customizing daily travel expense allocations, the system comprising:
a memory;
at least one processor communicatively coupled to the memory;
a set of sensor devices associated with a user device assigned to a user;
a selection component, implemented on the at least one processor, that analyzes training schedule data associated with a training event the user is scheduled to attend at a remote training location during a future time-period and real-time context data associated with a selected route between a first location and the remote training location using a set of mode selection criteria to select a mode of travel;

a prediction component, implemented on the at least one processor, that generates a predicted travel duration associated with the training event, the predicted duration comprising a set of training days associated with the training event and travel time associated with predicted round-trip travel time between the first location and the remote training location;

a calculation component, implemented on the at least one processor, that calculates an anticipated total predicted travel expenses to be incurred by the user during the predicted travel duration and a daily expense allotment for each day in the set of training days based on the selected mode and a rate associated with the selected mode;

an analysis component, implemented on the at least one processor, that analyzes sensor data obtained from the set of sensor devices to verify a presence of the user at the remote location on a given day in the set of training days;

an authorization component, implemented on the at least one processor, that authorizes allocation of the daily expense allotment to the user on a selected day on condition of verifying the presence of the user at the remote location based on the analysis and denies allocation of the daily expense allotment on failure to verify the presence of the user on the selected day; and an allocation component, implemented on the at least one processor, that disburses an amount of funds sufficient to cover predicted expenses associated with the selected day to a user account in real-time on the selected day.

11. The system of claim 10, further comprising:

a disbursement component, implemented on the at least one processor, that automatically reloads an account assigned to the user with the amount of funds equivalent to the daily expense allotment in a user selected medium of exchange at a predetermined time on each day in the set of training days, wherein the daily expense allotment comprises food expenses for each day and travel expenses associated with each day in the set of training days the user attends the training event.

12. The system of claim 10, wherein:

the allocation component, implemented on the at least one processor, uploads a batch file to a disbursement component, the batch file comprising at least one comma separated values file including a card reload value and a card identification number for each user in a plurality of users attending the training event, wherein the disbursement component utilizes the batch file to load funds from a funds repository to an account associated with a travel card assigned to each user in the plurality of users.

13. The system of claim 10, further comprising:

the analysis component, implemented on the at least one processor, that analyzes geolocation data generated by a global positioning sensor device associated with the user device assigned to the user to verify the presence of the user at the remote location on a given day prior to disbursing a daily expense allotment for the given day to the user.

* * * * *